US011530925B1

(12) United States Patent
Shields et al.

(10) Patent No.: US 11,530,925 B1
(45) Date of Patent: Dec. 20, 2022

(54) MULTI-COMPUTER SYSTEM FOR DYNAMICALLY DETECTING AND IDENTIFYING HAZARDS

(71) Applicant: Allstate Insurance Company, Northbrook, IL (US)

(72) Inventors: David Evan Shields, Evanston, IL (US); David Lambert, La Grange, IL (US); Kyle Patrick Schmitt, Chicago, IL (US); Pratheek M. Harish, Ontario (CA)

(73) Assignee: Allstate Insurance Company, Northbrook, IL (US)

( * ) Notice: Subject to any disclaimer, the term of this patent is extended or adjusted under 35 U.S.C. 154(b) by 371 days.

(21) Appl. No.: 16/713,777

(22) Filed: Dec. 13, 2019

Related U.S. Application Data

(60) Provisional application No. 62/783,485, filed on Dec. 21, 2018.

(51) Int. Cl.
*G01C 21/34* (2006.01)
*G06N 20/00* (2019.01)
*G08G 1/01* (2006.01)
*G08G 1/0967* (2006.01)
*G06N 5/04* (2006.01)

(52) U.S. Cl.
CPC ........... *G01C 21/3415* (2013.01); *G06N 5/04* (2013.01); *G06N 20/00* (2019.01); *G08G 1/0112* (2013.01); *G08G 1/0967* (2013.01)

(58) Field of Classification Search
CPC ................................................. G01C 21/3415
See application file for complete search history.

(56) References Cited

U.S. PATENT DOCUMENTS

| 6,459,991 | B1 * | 10/2002 | Takiguchi ............. G08G 1/166 |
| | | | 701/301 |
| 7,421,334 | B2 | 9/2008 | Dahlgren et al. |
| 8,766,817 | B2 | 7/2014 | Sri-Jayantha |
| 9,031,779 | B2 | 5/2015 | Djugash |
| 9,418,554 | B2 | 8/2016 | Velusamy |
| 9,475,500 | B2 | 10/2016 | Grimm et al. |
| 9,552,726 | B2 | 1/2017 | McGrath et al. |
| 9,679,487 | B1 | 6/2017 | Hayward |
| 9,792,817 | B2 | 10/2017 | Rider et al. |
| 9,898,759 | B2 * | 2/2018 | Khoury ................ H04L 67/535 |
| 9,898,931 | B1 | 2/2018 | Nickolaou |

(Continued)

OTHER PUBLICATIONS

Wolfgang Hall, "Telematics is teh Future", Esri Insider blog, Feb. 19, 2015, downloaded from <https://blogs.esri.com/esri/esri-insider/2015/02/19/telematics-is-the-future/> on Nov. 20, 2018.

(Continued)

*Primary Examiner* — Michael A Berns
(74) *Attorney, Agent, or Firm* — Polsinelli PC

(57) ABSTRACT

Systems, methods, computer-readable media, and apparatuses for providing hazard detection and broadcast functions are provided. In some examples, sensor data may be captured by a mobile device, vehicle, or the like. The data may be used to detect a hazard, identify a type of hazard, and the like. One or more users or groups of users for notification of the hazard may be identified and one or more notifications may be transmitted to users within the group.

20 Claims, 12 Drawing Sheets

(56) References Cited

U.S. PATENT DOCUMENTS

| | | | |
|---|---|---|---|
| 10,127,737 B1 | 11/2018 | Manzella et al. | |
| 10,157,422 B2* | 12/2018 | Jordan Peters | .... G06Q 30/0207 |
| 10,388,085 B2* | 8/2019 | Harish | ................... G06Q 40/08 |
| 10,846,799 B2* | 11/2020 | Madigan | ............... G07C 5/0825 |
| 11,127,042 B2* | 9/2021 | Wasserman | ....... G08G 1/096716 |
| 2016/0086285 A1 | 3/2016 | Jordan Peters et al. | |
| 2016/0379310 A1 | 12/2016 | Madigan et al. | |
| 2021/0053573 A1* | 2/2021 | Raichelgauz | .......... G08G 1/165 |

OTHER PUBLICATIONS

Pawar, et al., "Pothole Detection and Warning System using IBM Bluemix Platform", International Research Journal of Engineering and Technology (IRJET), vol. 03, Issue 11, Nov. 2016, pp. 1206-1209.

Orhan, et al., "Road Hazard Detection and Sharing with Multimodal Sensor Analysis on Smart phones" IEEE conference Sep. 25-27, 2013, downloaded from <https://ieeexplore.ieee.org/document/6658100> on Dec. 13, 2019.

"Realizing the Potential of Vehicle-Based Observations", A Report from the APT Committee on Mobile Observations, American Meteorological Society, Aug. 16, 2011.

Pawar et al., "Driver Assistance System using Pothole Detection and Warning Method", International Journal for Research in Applied Science & Engineering Technology (IJRASET), vol. 5, Issue V, May 2017, ISSN: 2321-9653, pp. 392-395.

\* cited by examiner

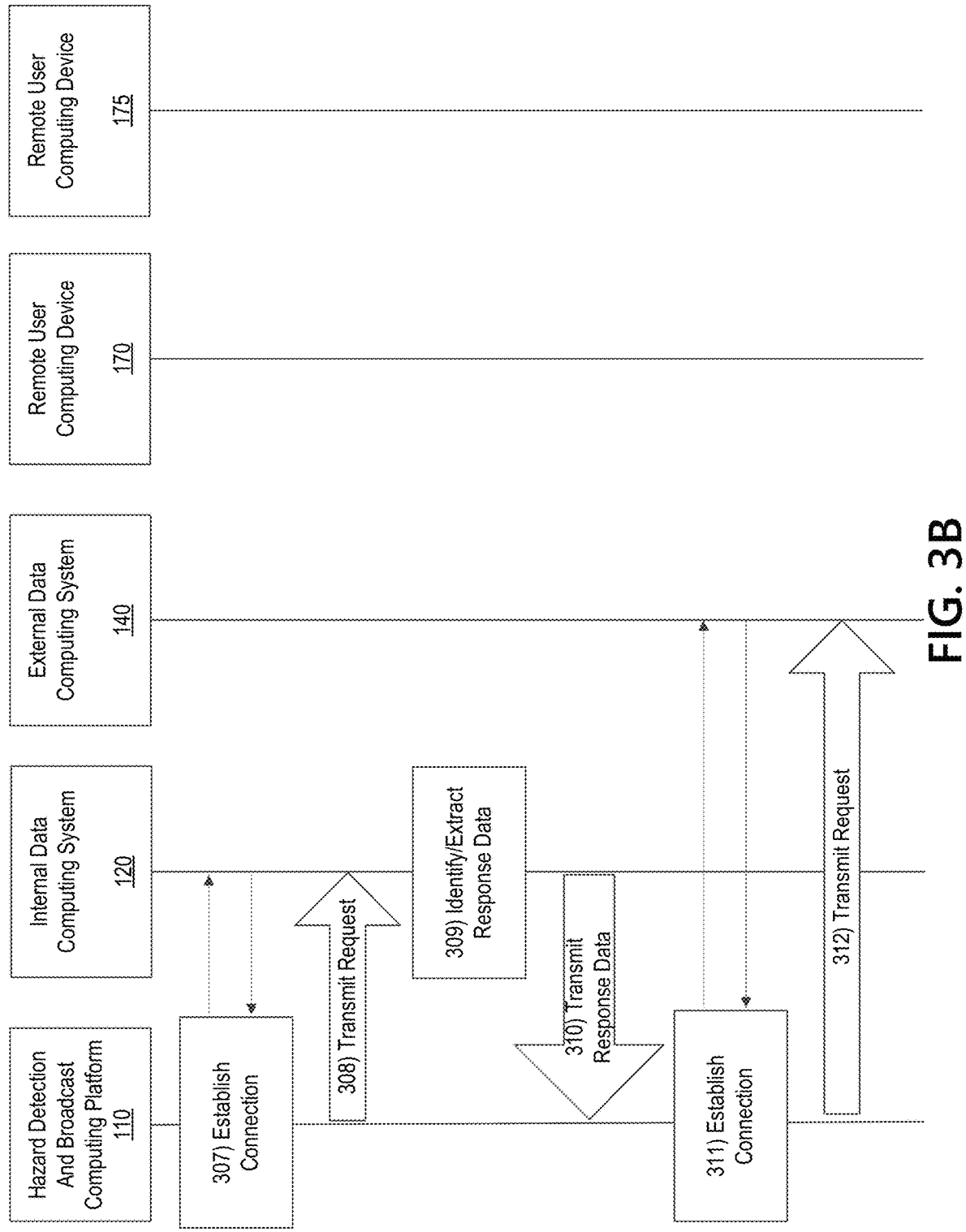

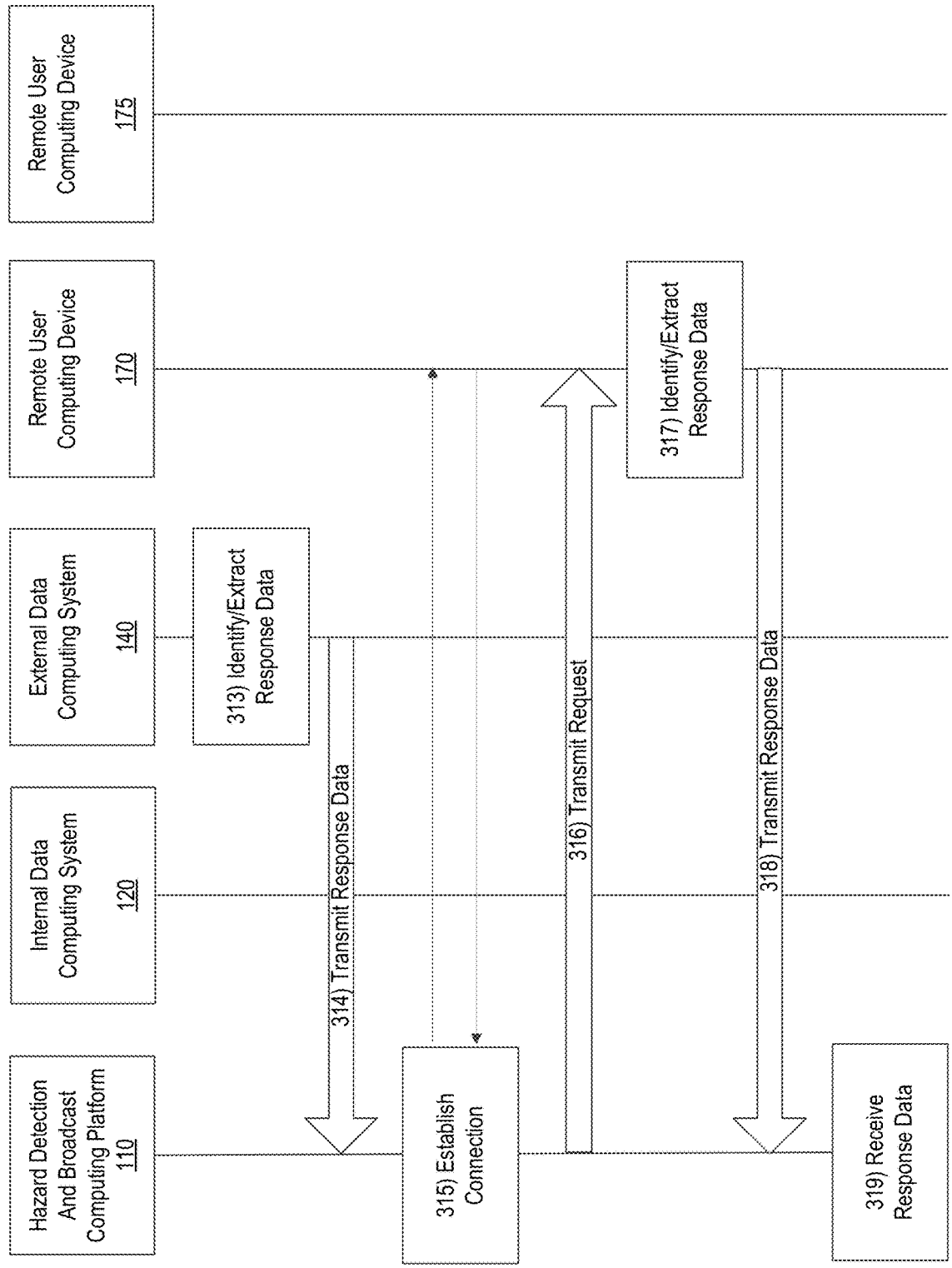

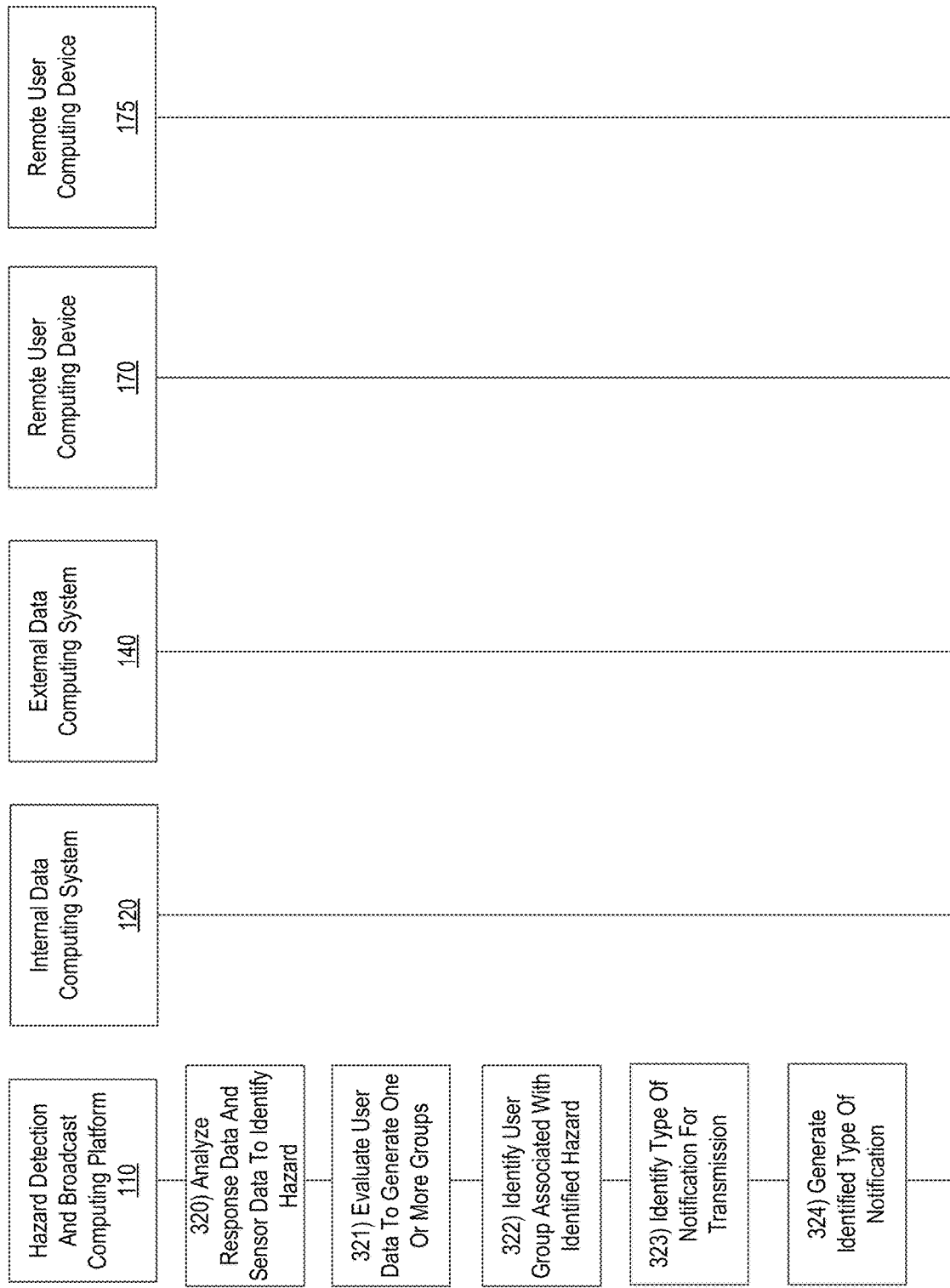

600

YOUR DATA HAS BEEN CAPTURED AND A HAZARD HAS BEEN IDENTIFIED!

We believe you struck a pothole heading east on
5$^{th}$ Street
Today at 2:06 p.m.

Because your data shows you travel this route often, consider taking an alternate route, such as 9$^{th}$ Street.

CANCEL　　　　　　　　　　　　　　　　　　　　　OK

A VEHICLE NEAR YOU HAS JUST STRUCK A POTHOLE heading east on
5$^{th}$ Street
Today at 2:06 p.m.

Please slow down in this area, leave extra distance between vehicles and consider taking an alternate route, such as 9$^{th}$ Street.

CANCEL　　　　　　　　　　　　　　　　　　　　　OK

FIG. 6B

MULTI-COMPUTER SYSTEM FOR DYNAMICALLY DETECTING AND IDENTIFYING HAZARDS

CROSS REFERENCE TO RELATED APPLICATIONS

This application is a non-provisional of and claims priority to U.S. Provisional Application No. 62/783,485, filed Dec. 21, 2018, and entitled "Multi-Computer System for Dynamically Detecting and Identifying Hazards," which is incorporated hereby by reference in its entirety.

TECHNICAL FIELD

Aspects of the disclosure generally relate to one or more computer systems, servers, and/or other devices including hardware and/or software. In particular, aspects are directed to identifying hazards or obstructions and broadcasting information associated with a detected hazard or obstruction.

BACKGROUND

As wireless communication between various devices becomes increasingly commonplace, this communication may be used to mitigate potential damage to a user. For instance, by communicating the existence of a road hazard, a user may avoid damage to a vehicle, causing an accident, or the like. However, capturing and evaluating data in real-time in order to identify a hazard is difficult in conventional arrangements. Further, identifying users to whom the information should be communicated is often inefficient and ineffective. Accordingly, it would be advantageous to provide a system to detect and identify hazards or obstructions, efficiently identify users and communicate information to the users.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to methods, computer-readable media, systems, and apparatuses for capturing data associated with movement of a vehicle, mobile device within a vehicle and the like. In some examples, the data may be used to detect that a hazard exists. In some arrangements, additional data may be received and the aggregated data may be used to detect a hazard, identify a type of hazard, and the like.

One or more arrangements may further identify groups of users. The groups may be based on common characteristics, similarities in driving data, relationship, physical proximity to each other or a location, and the like. Upon detection of a hazard, a group may be identified and one or more notifications may be transmitted to the group of users.

These and other features and advantages of the disclosure will be apparent from the additional description provided herein.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIGS. 3A-3E depict an illustrative event sequence for performing hazard detection and broadcast, according to one or more aspects described herein.

FIGS. 6A and 6B illustrate example user interfaces according to one or more aspects described herein.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

As discussed above, aspects described herein are related to capturing sensor data from a mobile device, vehicle, or the like. The data may be used to detect a hazard, identify a type of hazard, and the like. One or more users or groups of users for notification of the hazard may be identified and one or more notifications may be transmitted to users within the group.

These and other aspects will be described more fully herein.

Figure 1A:
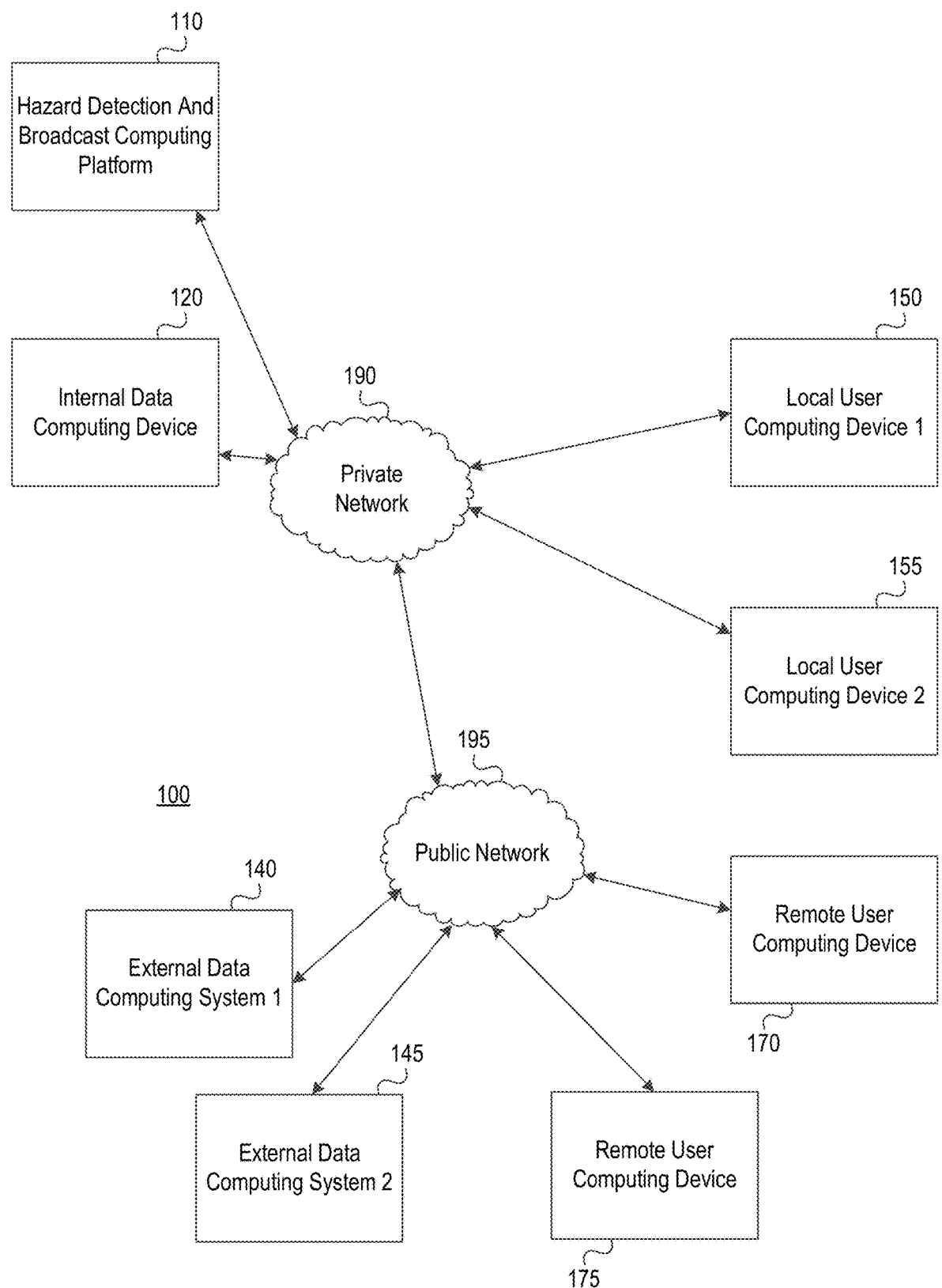
FIGS. 1A and 1B illustrate an illustrative computing environment for implementing hazard detection and broadcast control functions, according to one or more aspects described herein.
Figure 1B:
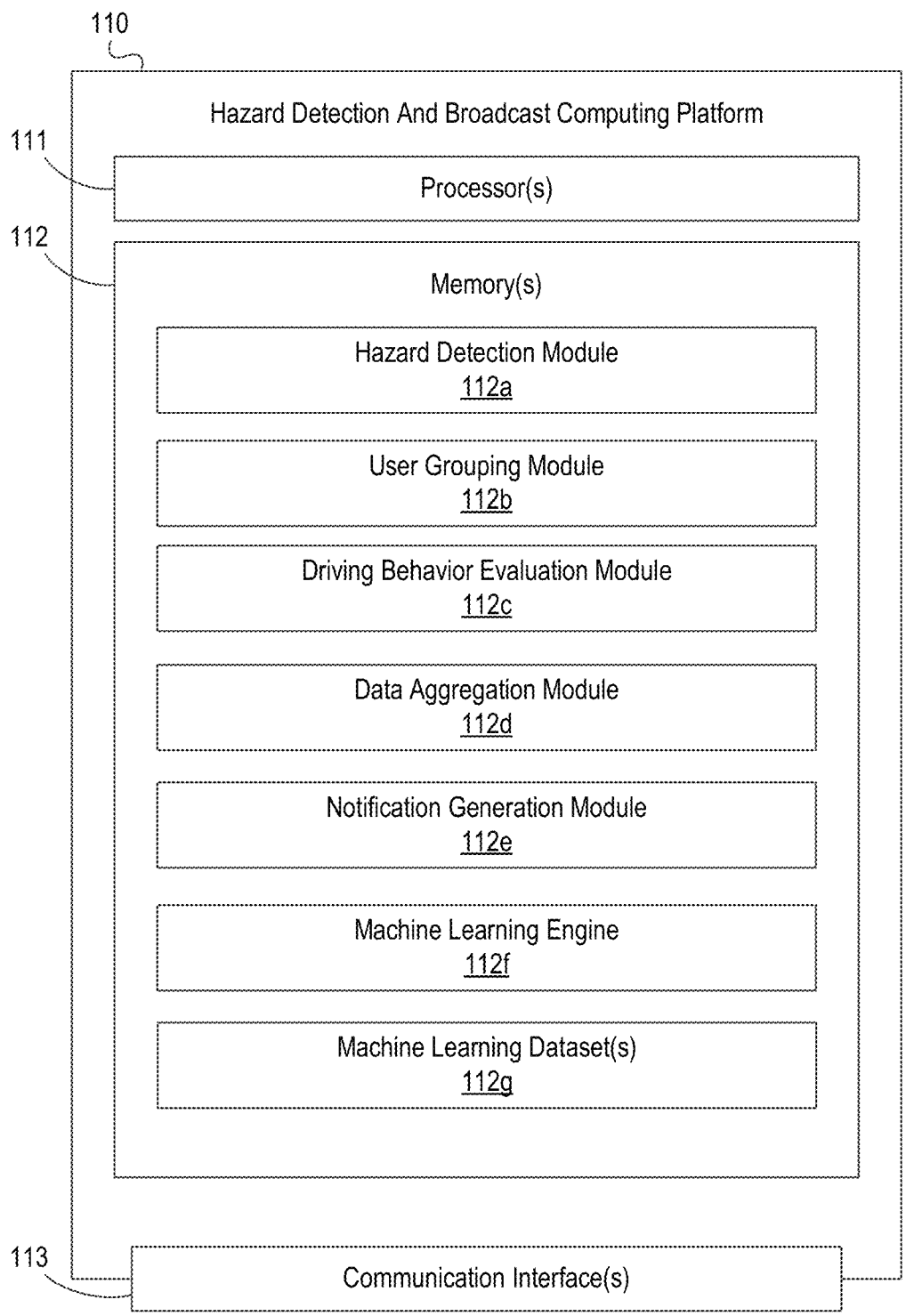

FIGS. 1A-1B depict an illustrative computing environment for implementing and using hazard detection, analysis and broadcast control system in accordance with one or more aspects described herein. Referring to FIG. 1A, computing environment 100 may include one or more computing devices and/or other computing systems. For example, computing environment 100 may include hazard detection and broadcast computing platform 110, an internal data computing device 120, a first local user computing device 150, a second local user computing device 155, a first external data computing system 140, a second external data computing system 145, a remote user computing device 170, and a remote user computing device 175.

Hazard detection and broadcast computing platform 110 may be configured to host and/or execute one or more modules including instructions for providing hazard detection, analysis and broadcast functions. In some examples, data may be received from a plurality of sources. For instance, data, such as vehicle telematics data, vehicle sensor data, mobile device sensor data, or the like, may be received from a plurality of vehicles. In some examples, additional data may be retrieved from a plurality of other sources. In some arrangements, the other sources may include internal sources (e.g., historical driving data, driving behavior data, road segment safety ratings, and the like) and/or external sources (e.g., publicly available data related to road conditions, environmental condition data, weather data, traffic signal data, location data, and the like). In some arrangements, the data may be aggregated and analyzed (e.g., in real-time or near real-time) to identify a hazard, obstruction, or the like, at a particular location. For instance, the data may be analyzed to identify a pothole in a particular location along a road. In another example, the data may be analyzed to identify traffic congestion or an accident. In yet another example, the data may be analyzed to identify debris at a particular location in or along a road that may, for example, cause drivers to swerve or brake hard. In some arrangements, the data may be analyzed to identify the hazard or obstruction by evaluating data related to driving behaviors (e.g., telematics data, other sensor data, and the like), to identify instances of swerving, hard braking, bumping due to pot holes (e.g., based on accelerometer data), lane deviations, sudden speed changes, stopped vehicles, road smoothness, and the like. In some arrangements, machine learning may be used to analyze the data.

Upon detection of a hazard or obstruction, the system may transmit a notification to one or more devices (e.g., vehicles, mobile devices associated with various users, or the like) identifying the hazard or obstruction, providing alternate route information, providing a warning system, and the like. In some examples, the hazard detection and broadcast computing platform 110 may identify particular recipients (e.g., users, devices, etc.) to which to transmit the notification. For example, if a hazard or obstruction is detected at a particular location, the hazard detection and broadcast computing platform 110 may identify a plurality of vehicles within a predefined distance of the vehicle at which the hazard was detected and may transmit a notification to the identified vehicles. In some examples, the notification may be transmitted back to the detecting vehicle that may then transmit a signal and/or the notification to a plurality of vehicles at a similar location via vehicle-to-vehicle communication. In another example, the hazard detection and broadcast computing platform 110 may identify the plurality of vehicles based on current global positioning system (GPS) data received from the plurality of vehicles and may transmit to, for instance, on-board vehicle computing devices, mobile devices associated with users of the vehicle, and the like, the notification.

In some arrangements, the hazard detection and broadcast computing platform 110 may group users according to one or more criteria. For instance, users may be grouped by family, first responders, school buses, public transportation, rideshare/taxi drivers, fleet vehicles, food delivery, users having a particular driving behavior based on historical driving data, and the like. Accordingly, upon detecting a hazard or obstruction associated with the group, the notification may be transmitted to the entire group, a portion of the group, or the like.

In some examples, the notifications may be personalized for a particular user or group. For instance, a notification may be personalized for members of a family, for first responders, for public transportation, or the like. Accordingly, the notification transmitted may be tailored to deliver a particular message to a particular user or group of users.

Internal data computing device 120 may have, store and/or include data associated with or obtained by an entity implementing the hazard detection and broadcast computing platform 110 and/or stored by the entity. In some examples, internal data computing device 120 may include data associated with customers, one or more insurance claims, accident histories and associated damages or costs, risk ratings associated with a road or road segment, pricing data, user information, driving behavior data, historical vehicle and/or mobile device sensor data, and the like. In some examples, internal data computing device 120 may include multiple computing devices storing various different types of data. In other examples, internal data computing device 120 may store the various types of data. In still other examples, internal data computing device 120 may query databases in one or more other computing devices, systems, or the like, to obtain data that may be used in one or more processes described herein.

External data computing system 140 and external data computing system 145 may have, store and/or include data from outside of or external to the entity. For instance, external data computing system 140 and/or external data computing system 145 may include systems and data associated with weather data, environmental condition data, traffic data, traffic signal data, other vehicle data (e.g., on-board vehicle diagnostic data from vehicles not associated with the entity or hazard detection and broadcast computing platform 110), public image or video data, real-time anonymous messaging data, and the like.

Local user computing device 150 and local user computing device 155 may be computing devices associated with an entity implementing or operating the hazard detection and broadcast computing platform 110. For instance, local user computing device 150, 155 may be computing devices used to develop and/or modify one or more applications associated with extracting and/or transmitting data, generating user interfaces, generating notifications, controlling rules and parameters of the hazard detection and broadcast computing platform 110, and the like.

Remote user computing device 170 and remote user computing device 175 may be computing devices not associated with the entity implementing or operating the hazard detection and broadcast computing platform 110 (e.g., owned by a customer, service provider, vendor, or the like, rather than the entity). Remote user computing device 170, 175 may be computing devices associated with a user (e.g., a mobile device of a user). As discussed herein, remote user computing device 170, 175 may be used to transmit data related to vehicle conditions, road conditions, or the like, receive and display notifications, and the like.

Local user computing device 150, 155, internal data computing system 120, external data computing system 140, external data computing system 145, remote user computing device 170, and remote user computing device 175 may be configured to communicate with and/or connect to one or more computing devices or systems shown in FIG. 1A. For instance, local user computing device 150, 155 and/or internal data computing device 120 may communicate with one or more computing systems or devices via network 190, while remote user computing device 170, remote user computing device 175, external data computing system 140, and/or external data computing system 145 may communicate with one or more computing systems or devices via network 195.

In one or more arrangements, internal data computing device 120, local user computing device 150, local user computing device 155, external data computing system 140, external data computing system 145, remote user mobile computing device 170, and/or remote user computing device 175 may be or include any type of computing device or combination of devices configured to perform the particular functions described herein. For example, internal data computing device 120, local user computing device 150, local user computing device 155, external data computing system 140, external data computing system 145, remote user mobile computing device 170, and/or remote user computing device 175 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of hazard detection and broadcast computing platform 110, internal data computing device 120, local user computing device 150, local user computing device 155, external data computing system 140, external data computing system 145, remote user computing device 170, and/or remote user computing device 175 may, in some instances, be or include special-purpose computing devices configured to perform specific functions.

Computing environment 100 also may include one or more computing platforms. For example, and as noted above, computing environment 100 may include hazard detection and broadcast computing platform 110. As illustrated in greater detail below, hazard detection and broadcast computing platform 110 may include one or more computing devices configured to perform one or more of the functions described herein. For example, hazard detection and broadcast computing platform 110 may have or include one or more computers (e.g., laptop computers, desktop computers, tablet computers, servers, server blades, or the like).

As mentioned above, computing environment 100 also may include one or more networks, which may interconnect one or more of hazard detection and broadcast computing platform 110, internal data computing device 120, local user computing device 150, local user computing device 155, external data computing system 140, external data computing system 145, remote user computing device 170, and/or remote user computing device 175. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, hazard detection and broadcast computing platform 110, internal data computing device 120, local user computing device 150, and/or local user computing device 155, may be associated with an organization, and private network 190 may be associated with and/or operated by the organization, and may include one or more networks (e.g., LANs, WANs, virtual private networks (VPNs), or the like) that interconnect hazard detection and broadcast computing platform 110, internal data computing device 120, local user computing device 150, and/or local user computing device 155, and one or more other computing devices and/or computer systems that are used by, operated by, and/or otherwise associated with the organization. Public network 195 may connect private network 190 and/or one or more computing devices connected thereto (e.g., hazard detection and broadcast computing platform 110, internal data computing device 120, local user computing device 150, local user computing device 155) with one or more networks and/or computing devices that are not associated with the organization. For example, external data computing system 140, external data computing system 145, remote user computing device 170, and/or remote user computing device 175 might not be associated with an organization that operates private network 190 (e.g., because external data computing system 140, external data computing system 145, remote user computing device 170 and remote user computing device 175 may be owned, operated, and/or serviced by one or more entities different from the organization that operates private network 190, such as one or more customers of the organization, public or government entities, and/or vendors of the organization, rather than being owned and/or operated by the organization itself or an employee or affiliate of the organization), and public network 195 may include one or more networks (e.g., the internet) that connect external data computing system 140, external data computing system 145, remote user computing device 170 and remote user computing device 175 to private network 190 and/or one or more computing devices connected thereto (e.g., hazard detection and broadcast computing platform 110, internal data computing device 120, local user computing device 150, and/or local user computing device 155).

Referring to FIG. 1B, hazard detection and broadcast computing platform 110 may include one or more processors 111, memory 112, and communication interface 113. A data bus may interconnect processor(s) 111, memory 112, and communication interface 113. Communication interface 113 may be a network interface configured to support communication between hazard detection and broadcast computing platform 110 and one or more networks (e.g., private network 190, public network 195, or the like). Memory 112 may include one or more program modules having instructions that when executed by processor(s) 111 cause hazard detection and broadcast computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of hazard detection and broadcast computing platform 110 and/or by different computing devices that may form and/or otherwise make up hazard detection and broadcast computing platform 110.

For example, memory 112 may have, store, and/or include hazard detection module 112a. Hazard detection module 112a may store instructions and/or data that may cause or enable the hazard detection and broadcast computing platform 110 to receive data from, for example, a plurality of sources. For instance, the hazard detection module 112a may receive data from various internal and external sources (e.g., vehicle data, mobile device data, other sensor data, environmental data, historical data, and the like) and may analyze the data to determine whether a hazard or obstruction exists. In some examples, data related to driving behaviors such as swerving, lane departures, hard braking, sudden speed changes, and the like, may be evaluated to identify a potential hazard or obstruction. Additionally or alternatively, data from other vehicles (e.g., within a predefined proximity of a first vehicle) may be evaluated to determine stopped vehicles, slowed traffic, or the like. Further, data related to bumps in a road (e.g., based on accelerometer data) may be evaluated to identify potholes, debris, or the like. Data related to road smoothness (e.g., based on a smooth ride factor determined from data related to other hazards and debris, vehicle noise levels on a road or road segment, and the like) may also be used to identify a hazard or obstruction.

Hazard detection and broadcast computing platform 110 may further have, store and/or include a user grouping module 112b. User grouping module 112b may store instructions and/or data that may cause or enable the hazard detection and broadcast computing platform 110 to receive data related to a plurality of users and generate groups of users. For instance, data associated with users (e.g., publicly available data, driving data, historical data, and the like) may be used to generate one or more groups of user. Each group of users may have one or more common features, aspects or parameters. For instance, each group of users may have a common purpose (e.g., first responder, bus driver, fleet vehicle driver, or the like), common driving behaviors (e.g., hard brakers, rapid speed changers, etc.), or other common or similar characteristic. These groups may be generated based on the common or similar features or characteristics and the groups may be used to efficiently identify users to receive a notification and transmit notifications to users.

Hazard detection and broadcast computing platform 110 may further have, store and/or include driving behavior evaluation module 112*c*. Driving behavior evaluation module 112*c* may store instructions and/or data that may cause or enable the hazard detection and broadcast computing platform 110 to receiving driving data (e.g., on board vehicle diagnostic data, telematics data, sensor data from a vehicle or mobile device, or the like) and analyze the data to identify behaviors or patterns in the data. These driving behaviors may be used to identify and generate groups, identify users to receiving a notification, and the like.

Hazard detection and broadcast computing platform 110 may further have, store, and/or include a data aggregation module 112*d*. Data aggregation module 112*d* may store instructions and/or data that may cause or enable the hazard detection and broadcast computing platform 110 to receiving data from a plurality of sources (e.g., internal data sources, external data sources, vehicle sources, and the like) and aggregate the data for further analysis. In some examples, aggregated data may be used to identify hazards, generate notifications, identify users to receive notifications, and the like. Alternatively, one or more of those aspects may be performed based on one or more components of the data (e.g., rather than an aggregated version of all data).

Hazard detection and broadcast computing platform 110 may further have, store and/or include notification generation module 112*e*. Notification generation module 112*e* may store instructions and/or data that may cause or enable the hazard detection and broadcast computing platform 110 to generate one or more notifications related to an identified hazard and broadcast or transmit the generated notification to one or more devices (e.g., mobile devices, on-board vehicle computing devices, or the like).

Hazard detection and broadcast computing platform 110 may further have, store and/or include a machine learning engine 112*f* and machine learning datasets 112*g*. Machine learning engine 112*f* and machine learning datasets 112*g* may store instructions and/or data that cause or enable hazard detection and broadcast computing platform 110 to evaluate data, such as data received from a plurality of data sources, to determine whether a hazard or obstruction exists, identify users to whom a notification should be transmitted, and/or generate user groups. The machine learning datasets 112*g* may be generated based on analyzed data (e.g., data from previously received data related to a hazard, historical data, user data, and the like), raw data, and/or received from one or more outside sources.

The machine learning engine 112*f* may receive data and, using one or more machine learning algorithms, may generate one or more machine learning datasets 112*g*. Various machine learning algorithms may be used without departing from the invention, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. Additional or alternative machine learning algorithms may be used without departing from the invention. In some examples, the machine learning engine 112*f* may analyze data to identify patterns of activity, sequences of activity, and the like, to generate one or more machine learning datasets 112*g*.

The machine learning datasets 112*g* may include machine learning data linking one or more types of sensor data, driving behaviors, or the like to a likelihood of a hazard or particular type of hazard. Additionally or alternatively, the machine learning datasets 112*g* may include machine learning data linking one or more user behaviors, characteristics, or the like, in order to generate one or more user groups. Further, the machine learning datasets 112*g* may include machine learning data linking sensor data or certain types of sensor data to one or more driving behaviors in order to evaluate and identify driving behaviors. Machine learning datasets 112*g* may include machine learning data linking various other types of data as well, without departing from the invention.

The machine learning datasets 112*g* may be updated and/or validated based on later-received data. For instance, as additional data collected from subsequent hazard evaluation or detection incidents may be used to validate and/or update the machine learning datasets 112*g* based on the newly received information. Accordingly, the system may continuously refine determinations, outputs, and the like.

Figure 2:
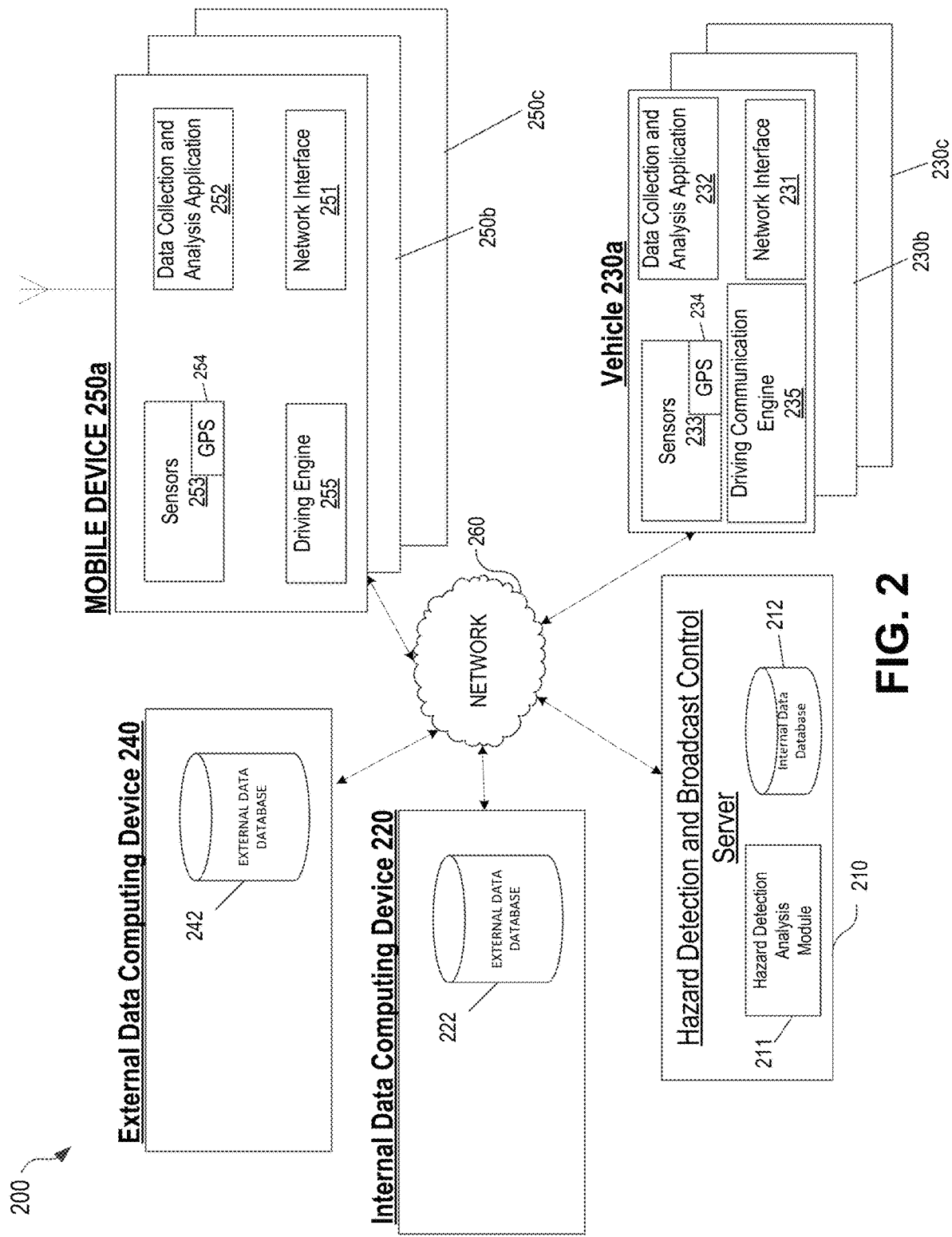
FIG. 2 illustrates one example system for implementing one or more hazard detection and broadcast control functions in accordance with one or more aspects described herein.

FIG. 2 is a diagram of an illustrative hazard detection and broadcast system 200 including hazard detection and broadcast control server 210, internal data computing device 220, vehicle 230, external data computing device 240, a mobile device 250, and additional related components. Each component shown in FIG. 2 may be implemented in hardware, software, or a combination of the two. Additionally, each component of the hazard detection and broadcast control system 200 may include a computing device (or system) having some or all of the structural components described herein for computing device 701 in FIG. 7. The hazard detection and broadcast control system 200 may also include or be in communication with one or more computing platforms, servers, devices, and the like, shown and described with respect to FIGS. 1A and 1B.

Hazard detection and broadcast control server 210, internal data computing device 220, external data computing device 240, vehicle 230, and/or mobile device 250 may communicate with each other via wireless networks or wired connections, and each may communicate with additional mobile computing devices, other remote user computing devices (e.g., remote user computing device 170) and/or a number of external computer servers, devices, etc. 210, 240, over one or more communication networks 260.

As discussed herein, the components of hazard detection and broadcast control system 200, operating individually or using communication and collaborative interaction, may perform such features and functions such as receiving data from a plurality of sources, evaluating data to identify a hazard or obstruction, generate a notification, transmit a notification to a generated group of users, and the like.

Hazard detection and broadcast control system 200 may include one or more mobile devices 250. Although mobile device 250*a* is shown, additional mobile devices (e.g., mobile devices 250*b*, 250*n* associated with other users, vehicles, or the like) may be part of the system without departing from the invention. Mobile device 250*a* may be, for example, a smartphone or other mobile phone, tablet computer, laptop computer, wearable devices such as smart watches and fitness monitors, and the like. Mobile device 250*a* may include some or all of the elements described herein with respect to the computing device 701 in FIG. 7.

Mobile device 250*a* may include a network interface 251, which may include various network interface hardware (e.g., adapters, modems, wireless transceivers, etc.) and software components to enable mobile device 250 to communicate with hazard detection and broadcast control server 210, internal data computing device 220, external data computing device 240, vehicle 230, and various other external computing devices. One or more specialized software applications, such as data collection and analysis application 252 may be stored in the memory of the mobile device 250*a*. The data collection and analysis application(s) 252 may be received via network interface 251 from the hazard detection and broadcast control server 210, or other application providers (e.g., public or private application stores). Certain data collection and analysis applications 252 might not include user interface screens while other applications 252 may include user interface screens that support user interaction. Such applications 252 may be configured to run as user-initiated applications or as background applications. The memory of mobile device 250*a* also may include databases configured to receive and store sensor data received from mobile device sensors, and the like. Although aspects of the data collection and analysis application(s) 252 are described as executing on mobile device 250*a*, in various other implementations, some or all of the data collection and analysis functionality described herein may be implemented by hazard detection and broadcast control server 210.

As discussed herein, mobile device 250*a* may include various components configured to capture or collect data for use in identifying hazards or obstructions, identifying groups of users, transmitting or displaying notifications, and the like. For instance, data from sensors 253 (e.g., 1-axis, 2-axis, or 3-axis accelerometers, compasses, speedometers, vibration sensors, pressure sensors, gyroscopic sensors, etc.) and/or GPS receivers or other location-based services (LBS) 254, may be used by, for example, application 252 (or other device or module, e.g., hazard detection and broadcast control server 210) to determine movement of the mobile device 250*a*, translate movement to hazards or obstructions in a road or location, and the like.

Mobile device 250*a* may further include a driving engine 255. The driving engine 255 may be configured to transmit and/or receive (e.g., via network interface 251) sensor data, driving data, notification data, and the like.

The mobile device 250*a* may be configured to establish communication with hazard detection and broadcast control server 210 via one or more wireless networks (e.g., network 230).

The system 200 may further include an external data computing device 240. External data computing device 240 may store or receive data from one or more external data sources, such as user information, automotive information (e.g., driving behaviors, operational parameters, make, model, trim, etc.), transaction information, user behavioral information, and the like. This information may be aggregated and processed, for instance, by hazard detection and broadcast control server 240, to identify one or more hazards, identify one or more user to receive a notification, generate and/or transmit a notification, and the like. The external data computing device 240 may include an external data database 242 that may store data from one or more external sources for use in evaluating data, identifying hazards, generating notifications, and the like.

Figure 7:
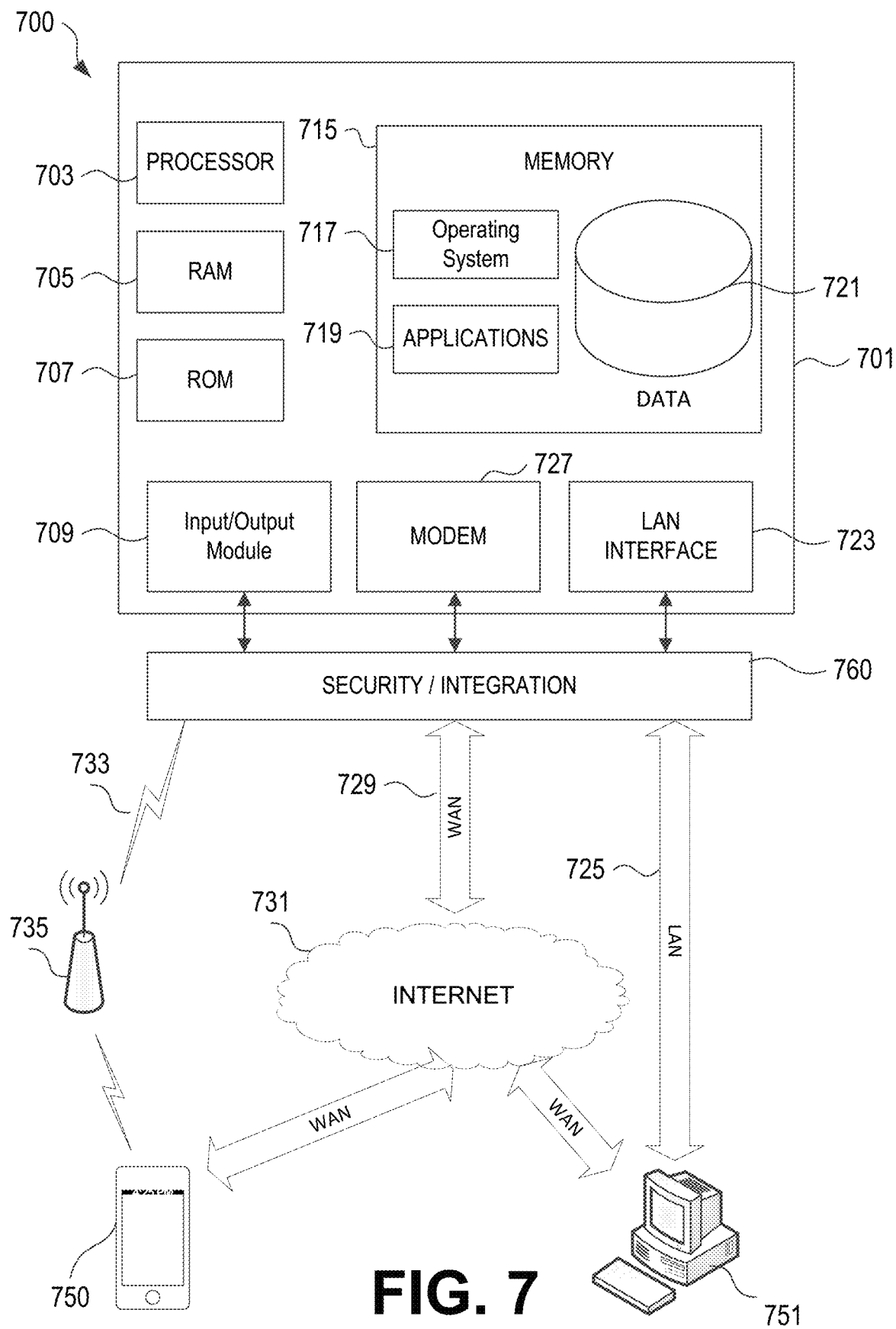
FIG. 7 illustrates a network environment and computing systems that may be used to implement aspects of the disclosure.

The system 200 also may include one or more external servers, such as hazard detection and broadcast control server 210 which may contain some or all of the hardware/software components as the computing device 701 depicted in FIG. 7.

The hazard detection and broadcast control server 210 may include some or all of the components and/or functionality described with respect to FIGS. 1A and 1B. The server 210 may include one or more databases 212 configured to store data associated with, for example, data internal to the entity (e.g., user or customer data, historical data relating to claims, accidents, and the like, vehicle performance data, driving data and/or patterns, and the like), that may be used to evaluate hazards, identify users for notification, and the like. Further, the server 210 may include hazard detection analysis module 211 which may provide some or all of the operations and/or functionality described with respect to FIGS. 1A and 1B.

System 200 may further include one or more vehicles 230. Vehicle 230*a* is shown in FIG. 2, however additional vehicles 230*b*, 230*n*, may be part of the system 200 without departing from the invention. Vehicle 230*a* may include one or more on-board vehicle computing devices and may include a network interface 231, which may include various network interface hardware (e.g., adapters, modems, wireless transceivers, etc.) and software components to enable vehicle 230*a* to communicate with hazard detection and broadcast control server 210, internal data computing device 220, external data computing device 240, mobile device 250, and various other external computing devices. One or more specialized software applications, such as data collection and analysis application 252 may be stored in the memory of the mobile device 250*a*. The data collection and analysis application(s) 232 may be received via network interface 231 from the hazard detection and broadcast control server 210, or other application providers (e.g., public or private application stores). Certain data collection and analysis applications 232 might not include user interface screens while other applications 232 may include user interface screens that support user interaction. Such applications 232 may be configured to run as user-initiated applications or as background applications. The memory of vehicle or vehicle computing device 230*a* also may include databases configured to receive and store sensor data received from mobile device sensors, vehicle sensors, and the like. Although aspects of the data collection and analysis application(s) 232 are described as executing on vehicle 230*a*, in various other implementations, some or all of the data collection and analysis functionality described herein may be implemented by hazard detection and broadcast control server 210.

As discussed herein, vehicle 230*a* may include various components configured to capture or collect data for use in identifying hazards or obstructions, identifying groups of users, transmitting or displaying notifications, and the like. For instance, data from sensors 233 (e.g., 1-axis, 2-axis, or 3-axis accelerometers, compasses, speedometers, vibration sensors, pressure sensors, gyroscopic sensors, etc.) and/or GPS receivers or other location-based services (LBS) 234, may be used by, for example, application 232 (or other device or module, e.g., hazard detection and broadcast control server 210) to determine movement of the vehicle 230a, translate movement to hazards or obstructions in a road or location, and the like.

The vehicle 230a may include vehicle operation sensors 233 capable of detecting and recording various conditions at the vehicle and operational parameters of the vehicle. For example, sensors 233 may detect and store data corresponding to the vehicle's speed, distances driven, rates of acceleration or braking, and specific instances of sudden acceleration, braking, and swerving. Sensors 233 also may detect and store data received from the vehicle's 230a internal systems, such as impact to the body of the vehicle, air bag deployment, headlights usage, brake light operation, door opening and closing, door locking and unlocking, cruise control usage, hazard lights usage, windshield wiper usage, horn usage, turn signal usage, seat belt usage, phone and radio usage within the vehicle, maintenance performed on the vehicle, and other data collected by the vehicle's computer systems.

Additional sensors 233 may detect and store the external driving conditions, for example, external temperature, rain, snow, light levels, and sun position for driver visibility. Sensors 233 also may detect and store data relating to moving violations and the observance of traffic signals and signs by the vehicle 230a. Additional sensors 233 may detect and store data relating to the maintenance of the vehicle 230a, such as the engine status, oil level, engine coolant temperature, odometer reading, the level of fuel in the fuel tank, engine revolutions per minute (RPMs), and/or tire pressure.

The vehicle 230a also may include one or more cameras and proximity sensors 233 capable of recording additional conditions inside or outside of the vehicle 230a. Internal cameras 230 may detect conditions such as the number of the passengers in the vehicle 230a, and potential sources of driver distraction within the vehicle (e.g., pets, phone usage, unsecured objects in the vehicle). External cameras and proximity sensors 233 may detect other nearby vehicles, traffic levels, road conditions, traffic obstructions, animals, cyclists, pedestrians, and other conditions that may factor into a driving event data analysis.

The operational sensors 233 and the cameras and proximity sensors 233 may store data within the vehicle 230a, and/or may transmit the data to one or more external computer systems (e.g., hazard detection and broadcast control server 210). The sensors 233, may be configured to transmit data to another device via a telematics device which may be associated with driving communication engine 235. In other examples, one or more of the vehicle sensors 233 may be configured to transmit data directly without using a telematics device. Thus, telematics device may be optional in certain embodiments.

Vehicle 230a may further include a driving communication engine 235. The driving communication engine 235 may be configured to transmit and/or receive (e.g., via network interface 231) sensor data, driving data, notification data, and the like. For instance, vehicle 230a may be configured to establish communication with hazard detection and broadcast control server 210, one or more mobile devices 250, one or more other vehicles 250, or the like, via one or more wireless networks (e.g., network 230).

For instance, vehicle 230a may further communicate with, for example, other nearby devices (e.g., mobile devices 250, other vehicles 230, or the like) via a short-range communication system. The short-range communication system may be vehicle-based data transmission systems configured to transmit vehicle operational data, other sensor data, notifications, or the like, to other nearby vehicles, and to receive vehicle operational data, sensor data, notifications, or the like, from other nearby vehicles. In some examples, communication system may use the dedicated short-range communications (DSRC) protocols and standards to perform wireless communications between vehicles. In the United States, 75 MHz in the 5.850-5.925 GHz band have been allocated for DSRC systems and applications, and various other DSRC allocations have been defined in other countries and jurisdictions. However, short-range communication system need not use DSRC, and may be implemented using other short-range wireless protocols in other examples, such as WLAN communication protocols (e.g., IEEE 802.11), Bluetooth (e.g., IEEE 802.15.1), or one or more of the Communication Access for Land Mobiles (CALM) wireless communication protocols and air interfaces. The vehicle-to-vehicle (V2V) transmissions between the short-range communication system and short-range communication systems of other vehicles or devices may be sent via DSRC, Bluetooth, satellite, GSM infrared, IEEE 802.11, WiMAX, RFID, and/or any suitable wireless communication media, standards, and protocols. In certain systems, short-range communication system may include specialized hardware installed in vehicle 230a (e.g., transceivers, antennas, etc.), while in other examples the communication system may be implemented using existing vehicle hardware components (e.g., radio and satellite equipment, navigation computers) or may be implemented by software running on the mobile device 250 of drivers and passengers within the vehicle 230a. In some arrangements, the short-range communication system may be part of driving communication engine 235.

The range of V2V communications between vehicle communication system and other systems may depend on the wireless communication standards and protocols used, the transmission/reception hardware (e.g., transceivers, power sources, antennas), and other factors. Short-range V2V communications may range from just a few feet to many miles, and different types of driving behaviors, vehicle operational parameters, and the like, may be determined depending on the range of the V2V communications.

V2V communications also may include vehicle-to-infrastructure (V2I) communications, such as transmissions to or from vehicles to or from non-vehicle receiving devices, such as infrastructure. For example, infrastructure may include one or more of toll booths, rail road crossings, parking garages, road segments, parking lots, buildings or other structures, and/or road-side traffic monitoring devices which may include one or more sensors for detecting environmental conditions (e.g., weather, lighting, etc.) as well as parking availability. Certain V2V communication systems may periodically broadcast data from a vehicle 230, such as vehicle 230a, to any other vehicle, such as vehicle 230b, 230n, or other infrastructure device capable of receiving the communication, within the range of the vehicle's transmission capabilities. For example, a vehicle 230 may periodically broadcast (e.g., every 0.1 second, every 0.5 seconds, every second, every 5 seconds, etc.) certain vehicle operation data via its short-range communication system, regardless of whether or not any other vehicles or reception devices are in range. In other examples, a vehicle communication system may first detect nearby vehicles and receiving devices, and may initialize communication with each by performing a handshaking transaction before beginning to transmit its vehicle operation data to the other vehicles and/or devices.

Broadcasts from infrastructure may also have varying ranges and, in some examples, infrastructure may broadcast to an intermediate station which may then relay the information to the hazard detection and broadcast control server 210 (or other device).

The types of data transmitted to or from vehicle 230*a* and/or infrastructure may depend on the protocols and standards used for the V2V or V2I communication, the range of communications, and other factors. In certain examples, vehicle 230*a* may periodically broadcast corresponding sets of similar vehicle driving data, such as the location (which may include an absolute location in GPS coordinates or other coordinate systems, and/or a relative location with respect to another vehicle or a fixed point), speed, and direction of travel. In certain examples, the nodes in a V2V (or V2I) communication system (e.g., vehicles and other reception devices) may use internal clocks with synchronized time signals, and may send transmission times within V2V (or V2I) communications, so that the receiver may calculate its distance from the transmitting node based on the difference between the transmission time and the reception time. The state or usage of the vehicle's controls and instruments may also be transmitted, for example, whether the vehicle is accelerating, braking, turning, and by how much, and/or which of the vehicle's instruments are currently activated by the driver (e.g., head lights, turn signals, hazard lights, cruise control, 4-wheel drive, traction control, etc.). Vehicle warnings such as a detection by the vehicle's internal systems that the vehicle is skidding, that an impact has occurred, or that the vehicle's airbags have been deployed, that a vehicle has stopped unexpectedly, also may be transmitted in V2V (or V2I) communications.

In various other examples, any data collected by any vehicle sensors 233 potentially may be transmitted via V2V or V2I communication to other nearby vehicles or infrastructure devices receiving V2V or V2I communications from communication system. Further, additional vehicle driving data not from the vehicle's sensors (e.g., vehicle make/model/year information, driver insurance information, driving route information, vehicle maintenance information, driver scores, etc.) may be collected from other data sources, such as a driver's or passenger's mobile device 250, and transmitted using V2V or V2I communications to nearby vehicles and other receiving devices using communication system.

FIGS. 3A-3E illustrate one example event sequence for performing hazard detection and broadcast control functions in accordance with one or more aspects described herein. The sequence illustrated in FIGS. 3A-3E is merely one example sequence and various other events may be included, or events shown may be omitted, without departing from the invention.

Figure 3A:
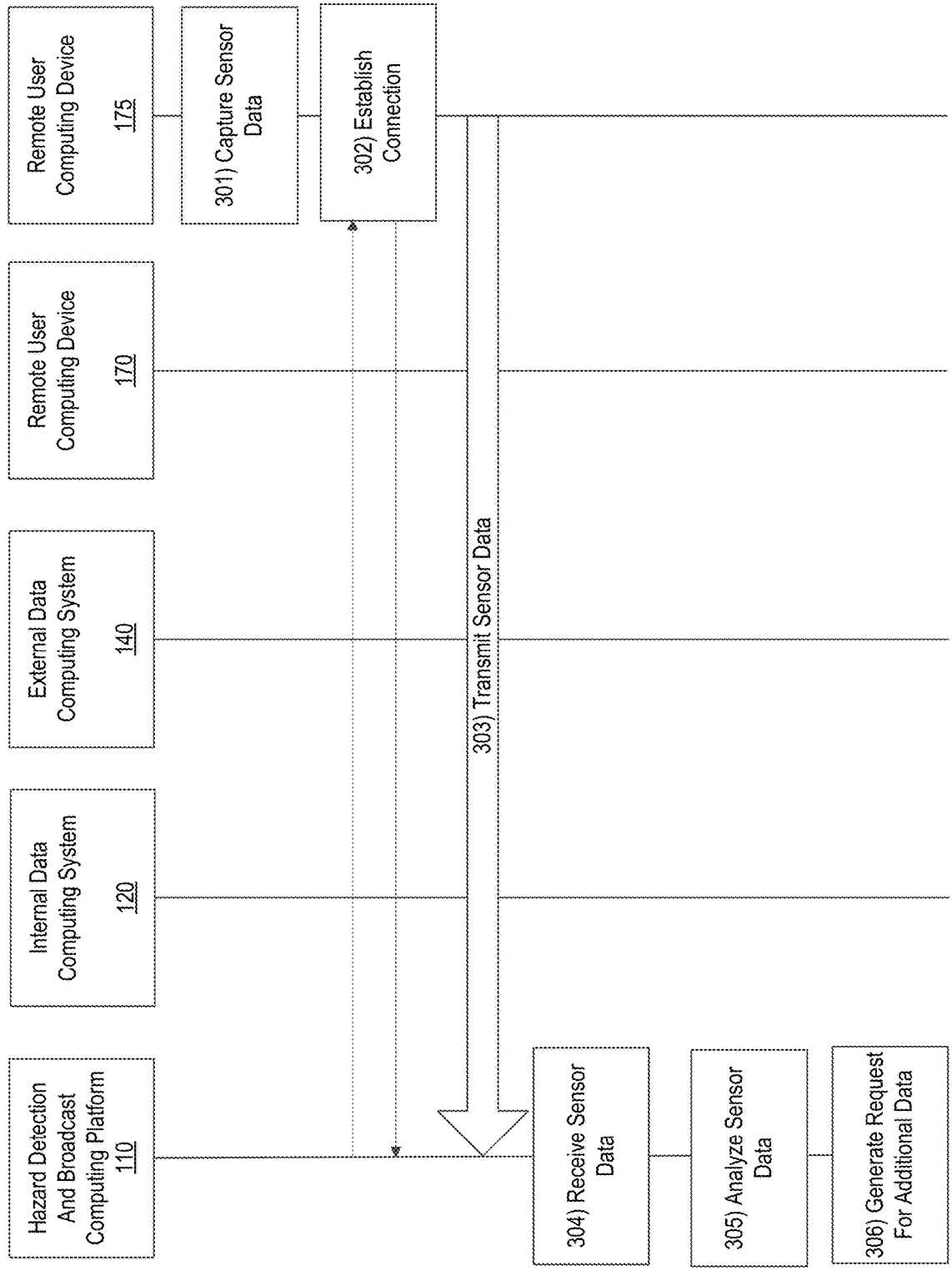

With reference to FIG. 3A, in step 301, sensor data may be captured by sensors within or associated with a remote user computing device 175. In some examples, the remote user computing device 175 may be a mobile device of a user. In other examples, the remote user computing device 175 may be an on-board vehicle computing device. For the example shown in FIGS. 3A-3E, remote user computing device 175 may be a mobile device of a user. However, one or more aspects discussed herein with respect to remote user computing device 175 may be performed by one or more other types of a devices, such as an on-board vehicle computing device, without departing from the invention.

In some examples, the captured sensor data may include movement data associated with the remote user computing device 175 as it is travelling in a vehicle, such as a car, motorcycle, recreational vehicle, or the like. The sensor data may include data captured from multiple directions of movement (e.g., 1-axis, 2-axis, or 3-axis accelerometers, compasses, speedometers, vibration sensors, pressure sensors, gyroscopic sensors, etc.). Further, the captured sensor data may include data associated with driving behaviors of a user (e.g., speeding, hard braking, swerving, lane departures, and the like). The sensor data may further include calendar data associated with a user (e.g., appointments, expected locations, and the like) and/or environmental condition data.

At step 302, a connection may be established between the remote user computing device 175 and the hazard detection and broadcast computing platform 110. For instance, a first wireless connection may be established between the remote user computing device 170 and the hazard detection and broadcast computing platform 110. Upon establishing the first wireless connection, a communication session may be initiated between the hazard detection and broadcast computing platform 110 and the remote user computing device 170.

At step 303, the captured sensor data may be transmitted from the remote user computing device 175 to the hazard detection and broadcast computing platform 110. For instance, the sensor data may be transmitted during the communication session initiated upon establishing the first wireless connection. At step 304, the captured sensor data may be received by the hazard detection and broadcast computing platform 110.

At step 305, the received sensor data may be analyzed by the hazard detection and broadcast computing platform 110. For instance, machine learning datasets may be used to evaluate the data to determine whether there is a likelihood of a hazard or obstruction in a road, along a road, along a route the user is travelling, or the like. In some examples, the data transmission and analysis may be performed in real-time or near real time.

In some examples, additional data may be desired to determine or identify a hazard, corroborate the likelihood of a hazard, or the like. Accordingly, at step 306, one or more requests for additional data may be generated.

With reference to FIG. 3B, at step 307 a connection may be established between the hazard detection and broadcast computing platform 110 and the internal data computing system 120. For instance, a second wireless connection may be established between the hazard detection and broadcast computing platform 110 and the internal data computing system 120. Upon establishing the second wireless connection, a communication session may be initiated between the hazard detection and broadcast computing platform 110 and the internal data computing system 120.

At step 308, the one or more generated requests for additional information may be transmitted from the hazard detection and broadcast computing platform 110 to the internal data computing system 120. For instance, the generated request for additional data may be transmitted during the communication session initiated upon establishing the second wireless connection. In some examples, the request for additional information may include requests for driving behaviors or patterns (e.g., associated with the user of the remote user computing device 175 based on data received from the remote user computing device 175, associated with other drivers, or the like), safety ratings of a route or road segment on which the user is travelling and on which the hazard has been detected or identified, road smoothness ratings for the road or route on which the hazard was detected or identified, or the like.

At step 309, response data responsive to the request for additional information may be identified and extracted. For instance, response data may be identified and extracted from a database storing data related to users, routes, road segments, and the like. The system may use a user name or identified, road identifier (e.g., based on GPS data received with the sensor data), or the like as input into a query to identify and extract the response data.

At step 310, the internal data computing system 120 response data may be transmitted from the internal data computing system 120 to the hazard detection and broadcast computing platform 110. For instance, the response data may be transmitted during the communication session initiated upon establishing the second wireless connection.

At step 311, a connection may be established between the hazard detection and broadcast computing platform 110 and the external data computing system 140. For instance, a third wireless connection may be established between the hazard detection and broadcast computing platform 110 and the external data computing system 140. Upon establishing the third wireless connection, a communication session may be initiated between the hazard detection and broadcast computing platform 110 and the external data computing system 140.

At step 312, the one or more generated requests for additional information may be transmitted from the hazard detection and broadcast computing platform 110 to the external data computing system 140. For instance, the generated request for additional data may be transmitted during the communication session initiated upon establishing the third wireless connection. In some examples, the request for additional information may include requests for publicly available data such as weather or other environmental data, traffic data, traffic congestion data, speed limit data, city-based intelligence network data (e.g., crime or red light camera data, city-based microphone systems to detect issues in an area, radio frequency identification data, video or closed circuit television data, or the like). In some examples, the city-based intelligence data, as well as other external and internal data, may be used to determine that a hazard exists, identify the hazard, and/or corroborate detection or identification of a hazard based on sensor data.

With reference to FIG. 3C, at step 313, response data responsive to the request for additional information may be identified and extracted. For instance, response data may be identified and extracted from a database storing data related to environmental conditions, traffic or roadway data, city-based intelligence data, and the like. The system may use a road identifier (e.g., based on GPS data received with the sensor data), or the like as input into a query to identify and extract the response data.

At step 314, the external data computing system 140 response data may be transmitted from the external data computing system 140 to the hazard detection and broadcast computing platform 110. For instance, the response data may be transmitted during the communication session initiated upon establishing the third wireless connection.

At step 315, a connection may be established between the hazard detection and broadcast computing platform 110 and the remote user computing device 170. For instance, a fourth wireless connection may be established between the hazard detection and broadcast computing platform 110 and the remote user computing device 170. Upon establishing the fourth wireless connection, a communication session may be initiated between the hazard detection and broadcast computing platform 110 and the remote user computing device 170.

Similar to remote user computing device 175, remote user computing device 170 may be a mobile device, on-board vehicle computing device, or the like. In the example shown in FIGS. 3A-3E remote user computing device 170 may be an on-board vehicle computing device associated with a vehicle other than the vehicle in which remote user computing device 175 is travelling (e.g., a vehicle other than the vehicle for which sensor data was captured and upon which the hazard is being detected). In some examples, the remote user computing device 170 may be an on-board vehicle computing device associated with a vehicle within a predefined proximity of the vehicle associated with remote user computing device 175 (e.g., based on GPS location data, or the like).

At step 316, the one or more generated requests for additional information may be transmitted from the hazard detection and broadcast computing platform 110 to the remote user computing device 170. For instance, the generated request for additional data may be transmitted during the communication session initiated upon establishing the fourth wireless connection. In some examples, the request for additional information may include requests for vehicle operation data, environmental condition data, and the like, associated with the vehicle (e.g., remote user computing device 170).

At step 317, response data responsive to the request for additional information may be identified and extracted. For instance, response data may be identified and extracted from a database storing data related to sensor data, vehicle operational data, environment condition data, and the like. The system may use a road identifier (e.g., based on GPS data received with the sensor data), or the like as input into a query to identify and extract the response data. In other examples, the system may capture a predetermined previous time period of data and may provide that as response data. For instance, the system may identify data captured within the last 30 second, 1 minute, 3 minutes, 5 minutes, 30 minutes, 2 hours, or the like, as response data.

At step 318, the remote user computing device 170 response data may be transmitted from the remote user computing device 170 to the hazard detection and broadcast computing platform 110. For instance, the response data may be transmitted during the communication session initiated upon establishing the fourth wireless connection.

At step 319, response data may be received by the hazard detection and broadcast computing platform 110. For instance, response data from one or more of internal data computing system 120, external data computing system 140, and/or remote user computing device 170 may be received by the hazard detection and broadcast computing platform 110.

With reference to FIG. 3D, at step 320, the received sensor data and response data may be analyzed to detect, identify and/or corroborate identification of a hazard detected within the sensor data. For instance, in some examples, the sensor data may be aggregated with the response data and, in some examples, machine learning datasets may be used to determine that a hazard was detected, identify a type of hazard (e.g., pothole, stopped vehicle, debris or obstruction, or the like), and the like. Additionally or alternatively, sensor data may be used to detect and/or identify the hazard and the response data may be used to confirm or corroborate detection of the hazard, identification of the type of hazard, and the like.

At step 321, users and user data may be analyzed or evaluated to identify one or more groups of users. In some examples, aspects associated with evaluating users, generating groups, and the like, may be performed prior to hazard detection aspects (e.g., prior to receiving and analyzed sensor data in real-time) or the groups may be periodically or continuously updated based on additional incoming data.

In some examples, machine learning may be used to identify groups of users. For instance, one or more machine learning datasets linking one or more user characteristics may be used to identify groups of users. Users may be grouped based on driving behaviors (e.g., hard braking, speeding, lane departures, safe driver rating, or the like) and/or other characteristics. For instance, members of a family may be identified as one group. Accordingly, when a hazard is identified for a device associated with one member of a family, all members of the family (e.g., the identified group) may be notified. In another example, groups may be identified based on profession. For instance, fleet vehicle drivers may be identified as a group, school bus drivers may be identified as a group, public transportation riders or drivers may be identified as a group, emergency responders may be identified as a group, rideshare and/or taxi drivers may be identified as a group, food delivery drivers may be identified as a group, and the like. In some examples, a group may include a single user or individual. Further, a group may be identified in real-time based on proximity of one or more vehicles to a vehicle detecting a hazard (e.g., all vehicles within 100 feet, 1000 meters, 1 mile, or the like may be identified, in real-time, as a group).

At step 322, one or more groups associated with the identified hazard may be identified. For instance, a group of users or vehicles within a predefined proximity of the detecting vehicle may be identified in real-time. In another example, a predefined group to which the detecting vehicle or user associated therewith belongs may be identified. In some examples, the group may be identified based on a location of a hazard (e.g., along a side of a road, a town or other highway department group might be identified, for potholes a department of public works may be identified in addition to other drivers, or the like). The group may also be identified based on a type of hazard identified (e.g., swerving, pothole, lane departure, stopped vehicle, or the like).

At step 323, a particular type of notification for transmission may be identified. For instance, notifications may be customized for a particular user, group of users, or the like. For instance, a notification may be personalized for a driver based on the type of hazard, known driving behaviors, or the like (e.g., late or hard brakers may be notified of upcoming traffic stoppages). Notifications may also be customized to provide alternate routes to users within a group receiving the notification. For instance, route or destination information for a driver may be determined and alternate routes for each driver within the group may be provided (e.g., each driver within the group may receive different alternate routes based on the respective destination). In another example, first responders may receive emergency alerts that may, in some examples, include written text and audio. Rideshare or taxi drivers may receive notifications to avoid an area. These examples are merely some example types of notifications that may be customized. Various other types of notifications and customizations may be used without departing from the invention.

At step 324, the identified type of notification may be generated. For instance, the notification may be generated to include particular data associated with the hazard (e.g., location, time, type, and the like) and may include data specifically tailored for the users or group of users to whom the notification will be transmitted.

Figure 3E:
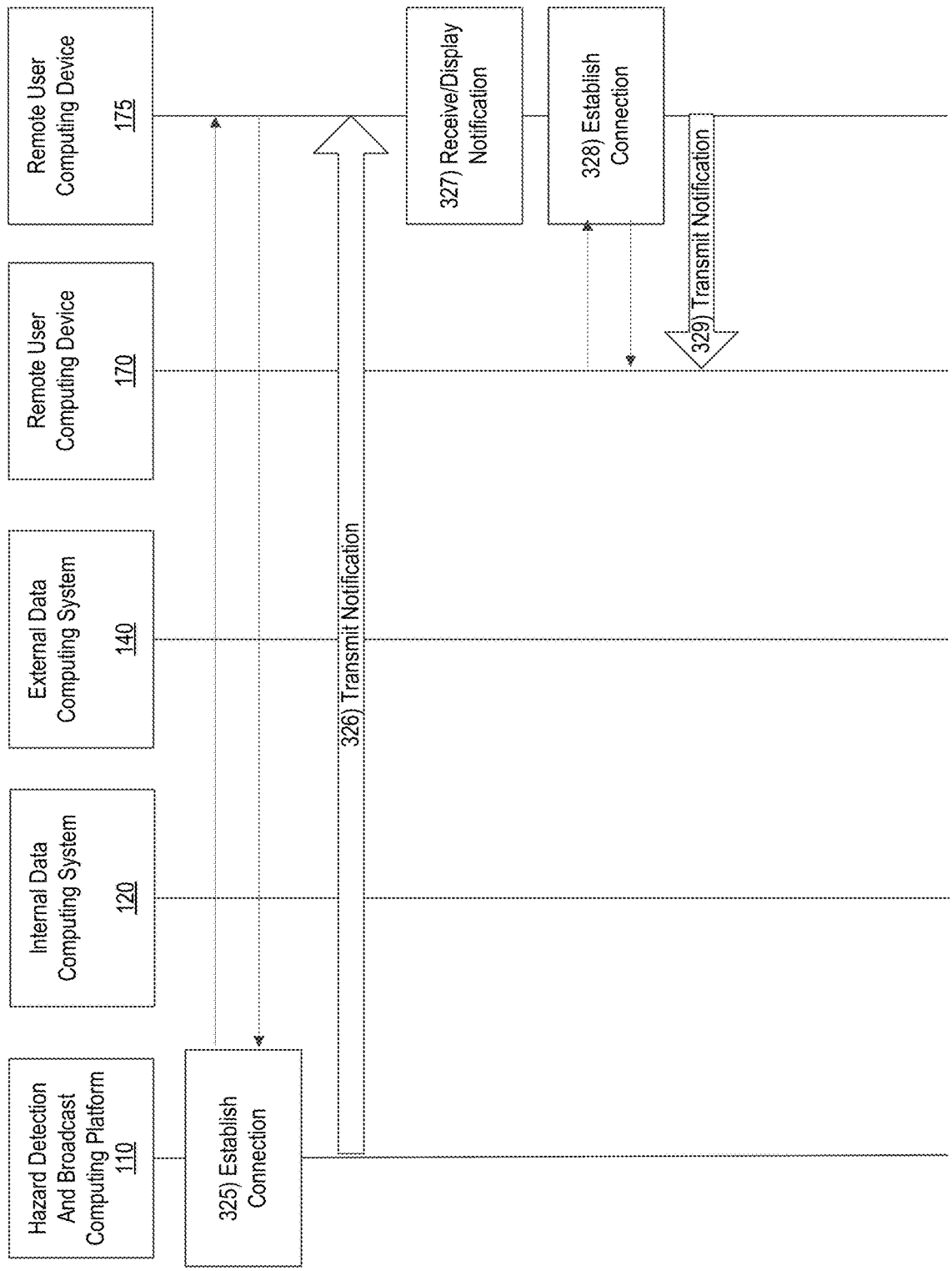

With reference to FIG. 3E, at step 325, a connection may be established between the hazard detection and broadcast computing platform 110 and the remote user computing device 175. For instance, a fifth wireless connection may be established between the hazard detection and broadcast computing platform 110 and the remote user computing device 175. Upon establishing the fifth wireless connection, a communication session may be initiated between the hazard detection and broadcast computing platform 110 and the remote user computing device 175.

At step 326, the generated notification may be transmitted to the remote user computing device 175. At step 327, the notification may be received and displayed by the remote user computing device 175.

In some examples, the remote user computing device 175 may then establish connections with one or more other computing devices (e.g., other mobile devices of users within the designated or identified group, other mobile devices or on-board vehicle computing devices of nearby vehicles, or the like) and may transmit the notification to those other devices. Accordingly, at step 328, a connection may be established between the remote user computing device 175 and one or more other remote user computing devices 170. For instance, a sixth wireless connection may be established between the remote user computing device 175 and one or more other remote user computing devices 170. Upon establishing the sixth wireless connection, a communication session may be initiated between the remote user computing device 175 and the one or more other remote user computing devices 170.

At step 329, the notification may be transmitted from the remote user computing device 175 to the one or more other remote user computing devices 170. In some examples, the notification may be transmitted via an application (such as data collection and analysis application 252 executing on the mobile device 175). The receiving remote user computing device 175 may also have the application executing thereon (e.g., application 252, 232, or the like) and notifications may be transmitted between the applications. Additionally or alternatively, driving engine 255 may receive and/or transmit notifications to other devices (e.g., driving communication engine 235 or the like). In examples, in which the remote user computing device 175 is an on-board vehicle computing device, notifications may be transmitted via vehicle-to-vehicle communications, as discussed herein.

Although the examples shown in FIGS. 3A-3E include transmitting a notification to the device detecting the hazard and that device transmitting the notification to other devices, in some examples, the hazard detection and broadcast computing platform 110 may transmit notifications directly to the device sensing the hazard as well as devices associated with other users within the group identified to receive the notification (e.g., without first transmitting to the detecting device).

Figure 4:
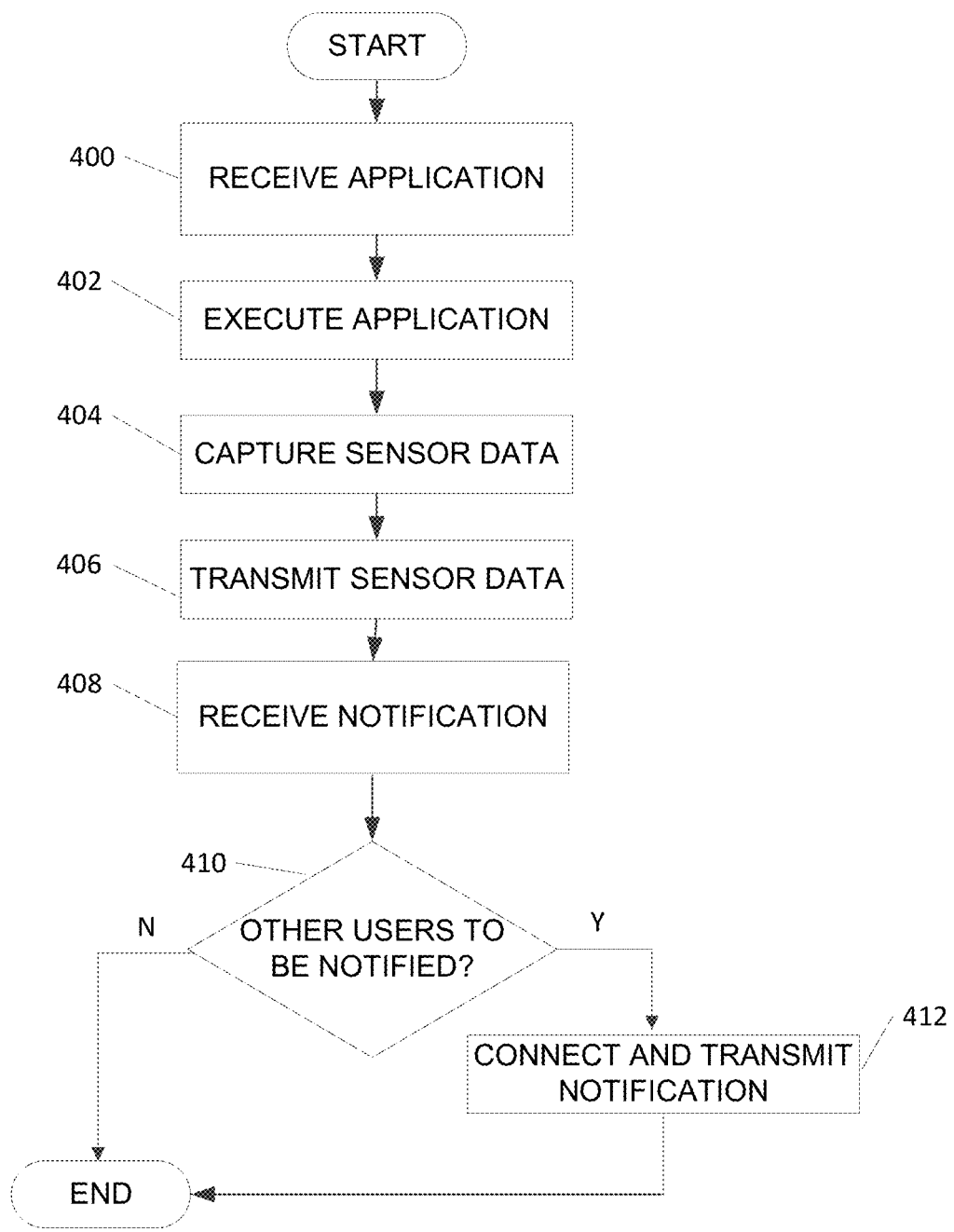
FIG. 4 illustrates one example flow chart illustrating an example method of hazard detection and broadcast functions, according to one or more aspects described herein.

FIG. 4 illustrates one example process for performing hazard detection and broadcast control functions according to one or more aspects described herein. The steps described with respect to FIG. 4 may be performed by one or more of the various devices and/or systems described herein, such as the remote user computing device 170 and/or remote user computing device 175 which may be a mobile device (such as mobile device 250a), an on-board vehicle computing device (such as described with respect to vehicle 230a), or the like. In some examples, one or more of the processes or steps described may be performed in real-time or near real-time.

In step 400, an application may be received by the device. For instance, an application may be downloaded or otherwise received by the device. The device may be provided by an entity implementing the hazard detection and broadcast computing platform 110. At step 402, the application may be executed by the device. For instance, the application may be executed by a user associated with the device (e.g., via user input in an on-demand manner) or the application may automatically execute upon download. In some arrangements, the application may continuously execute on the device (e.g., in a background of the device).

At step 404, sensor data may be captured. For instance, sensor data may be captured via one or more sensors within the device or associated therewith. In some examples, sensor data may be continuously captured.

At step 406, sensor data may be transmitted to the hazard detection and broadcast computing platform for further analysis. In some examples, all captured data may be transmitted. Additionally or alternatively, the application may detect a hazard (e.g., by evaluating sensor data at the device) and may transmit data upon detection of a hazard.

At step 408, a notification may be received from, for example, hazard detection and broadcast computing platform 110. The notification may include an indication of a location of the hazard, type of hazard, behaviors to avoid, or the like.

At step 410, a determination may be made as to whether other users (e.g., other users within an identified group) are to be notified. For instance, the hazard detection and broadcast computing platform 110 may transmit an instruction or command to transmit the notification to other devices (e.g., other mobile devices, other on-board vehicle devices, and the like). If, at step 410, other devices are to be notification, the device may connect to the one or more devices and transmit the notification. If not, the process may end.

Figure 5:
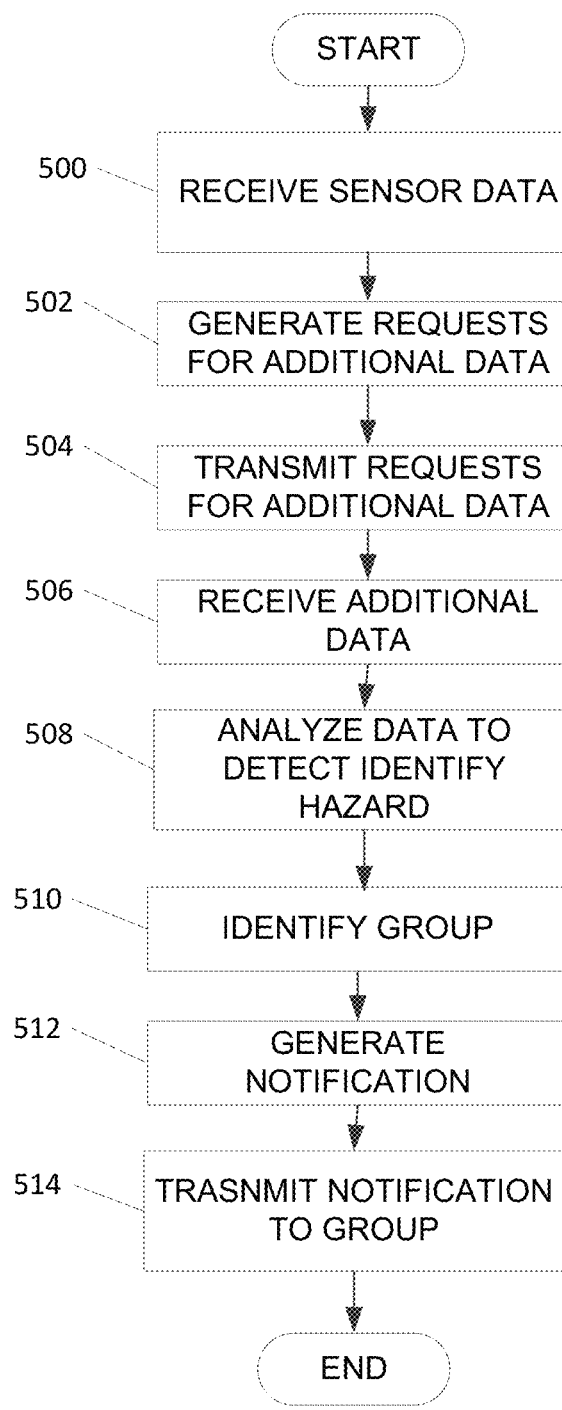
FIG. 5 illustrates another example flow chart illustrating an example method of hazard detection and broadcast functions, according to one or more aspects described herein.

FIG. 5 illustrates another example process for performing hazard detection and broadcast control functions according to one or more aspects described herein. The steps described with respect to FIG. 5 may be performed by one or more of the various devices and/or systems described herein, such as the hazard detection and broadcast computing platform, hazard detection and broadcast control server, or the like. In some examples, one or more of the processes or steps described may be performed in real-time or near real-time.

In step 500, sensor data may be received. For instance, sensor data may be received from one or more remote user computing devices (e.g., a mobile device, on-board vehicle computing device, or the like). The sensor data may include data associated with a road hazard or obstruction.

At step 502, requests for additional data may be generated. For instance, one or more requests for internal data (e.g., claim history, driving history, driving patterns or behaviors, user data, and the like), external data (e.g., environmental condition data, traffic data, and the like), other remote user computing devices (e.g., other mobile device sensor data, other vehicle sensor data, and the like) may be generated.

At step 504, the requests for additional data may be transmitted to one or more devices or systems. For instance, the requests may be transmitted to internal data computing systems, external data computing systems, mobile devices, on-board vehicle computing devices, and the like. At step 506, additional data may be received from the one or more devices to which requests were sent.

At step 508, the received data and sensor data may be analyzed to determine that a hazard exists, a type of hazard, a location of the hazard, and the like. In some examples, machine learning may be used to make one or more determinations.

At step 510, one or more groups of users may be identified. For instance, based on the hazard, type of hazard, location of hazard, or the like, one or more groups of users (or individual users) may be identified.

At step 512, a notification may be generated. The notification may include data associated with the hazard, alternate routes, driving behavior recommendations, or the like. At step 514, the generated notification may be transmitted to one or more devices associated with one or more users in the identified group, as well as the device at which the sensor data was captured in step 500.

FIGS. 6A and 6B illustrate example user interfaces that may be used to display generated notifications to one or more users in accordance with one or more aspects described herein. For instance, FIG. 6A includes an example notification 600 that may be transmitted to a user associated with the sensor data detecting the hazard, while FIG. 6B may include an example notification 650 that may be transmitted to other users in an identified group.

As shown in both FIGS. 6A and 6B, the notification may include identification of an alternate route. The notifications may provide information about the identified hazard (e.g., type of hazard, location, and the like). In some examples, the notifications may include various selectable options to reroute a user, generate a different alternate route, provide driving behavior recommendations (e.g., as shown in FIG. 6B), and the like.

As discussed herein, one or more aspects of the arrangements described herein may be performed in real-time or near real-time in order to provide the most up-to-date and accurate hazard information to users.

As discussed herein, one or more aspects are directed to capturing data via one or more sensors in a mobile device, vehicle, or the like. The data may be processed at the capturing device or transmitted for processing at a separate device, such as a hazard detection and broadcast computing platform 110 or the like. In some examples, the data may be used to detect or determine that a hazard exists at a particular location (e.g., on a road or road segment, along a roadway, or the like).

In some examples, the sensor data may be aggregated with data from a plurality of other sources and that data may be analyzed to detect or determine that a hazard exists, identify a type of hazard, and the like. In some examples, the additional data may include data from other vehicles near the vehicle or mobile device capturing the sensor data (e.g., vehicle telematics data, mobile device data, or the like), internal data sources, external data sources, and the like. For instance, the additional data may include data from one or more internal data stores and may include historical driving data, driving behaviors of users, claims data, and the like. The additional data may further include data from external sources, such as environmental data, traffic data, and the like. Data may be received from on-board vehicle computing devices, mobile devices, telematics devices, public databases, city-based intelligence networks, and the like.

In some examples, data transmitted from other vehicles may be transmitted using a messaging protocol configured for sharing real-time telematics or other data. For instance, the messaging protocol may enable making information accessible to others in an application-to-application communication scenario in real-time. In some examples, an application executing on a mobile device (e.g., application 252) or a computing device within a vehicle (e.g., application 232) may facilitate communication of data between devices. In some examples, driving engine 255 and driving communication engine 235 may further facilitate communication. In some examples, the data being shared (e.g., published, transmitted, displayed, or the like) may be anonymous data provided via a central location that may be managed by a centralized entity.

In analyzing the data, the system may evaluate a current user's driving (e.g., based on the received sensor data), movement of other vehicles and/or other driving behaviors on or near the road, environmental information, scheduling data (e.g., calendars, appointments, and the like) and the like.

In some examples, to detect a hazard and/or identify a type of hazard, the system may analyze the data to detect bumping over potholes (e.g., based on accelerometer data), swerving, lane departures, blinker usage, sudden speed changes, stopped vehicles, and the like.

In some examples, the system may evaluate the data to determine a road smoothness value or smooth ride factor. In some examples, the system may evaluate historical data associated with a road or road surface including potholes, gravel, debris, road irregularities and static noise inside a car driving along the road. This data may then be used to calculate a factor related to road smoothness. This factor may be used to identify hazards (e.g., a road is less smooth than a predetermined smoothness factor), identify types of hazards, and the like. In some examples, the smooth ride factor may be displayed to a user upon designating a route for a trip. Accordingly, the smooth ride factor may be used to determine an appropriate route. It can also be used to select a route (e.g., by the system), determine an insurance rate (e.g., frequent travel over smooth roads may earn a discount), determine risk for a particular road segment, or the like.

In some examples, data used to detect and/or identify hazards may be real-time data. Additionally or alternatively, the data may be historical data from a predefined previous time period (e.g., last week, last 3 months, last 6 months, last year, etc.). The data may be analyzed along with real-time driving data (e.g., behavior data) of the user to detect and identify hazards, generate and transmit a notification, and the like, as discussed more fully herein. In some examples, personalized recommendations may be generated for the users (e.g., slow down, brake earlier, or the like). The particular recommendation may be based on historical driving data of the user, current driving data, or the like.

As also discussed herein, one or more groups of users may be generated. For instance, users may be grouped based on common characteristics, similar driving behaviors, relationship, or the like. Notifications may then be generated for a group of users and transmitted to the group. In some examples, the notifications may be customized for the particular group (e.g., fleet drivers, rideshare/taxi drivers, school bus drivers, individual drivers, or the like).

FIG. 7 illustrates a block diagram of a hazard detection and broadcast computing device (or system) 701 in a computer system 700 that may be used according to one or more illustrative embodiments of the disclosure. The computing device 701 may have a processor 703 for controlling overall operation of the hazard detection and broadcast computing device 701 and its associated components, including RAM 705, ROM 707, input/output module 709, and memory 715. The computing device 701, along with one or more additional devices (e.g., terminals 750 and 751, security and integration hardware 760) may correspond to any of multiple systems or devices, such as a user personal mobile computing device, computing platform, or a computer server, configured as described herein for capturing sensor data, transmitting or receiving data, identifying a hazard or obstruction, generating groups, transmitting notifications, and the like.

Input/Output (I/O) 709 may include a microphone, keypad, touch screen, and/or stylus through which a user of the hazard detection and broadcast computing device 701 may provide input, and may also include one or more of a speaker for providing audio output and a video display device for providing textual, audiovisual and/or graphical output. Software may be stored within memory 715 and/or storage to provide instructions to processor 703 for enabling hazard detection and broadcast computing device 701 to perform various actions. For example, memory 715 may store software used by the hazard detection and broadcast computing device 701, such as an operating system 717, application programs 719, and an associated internal database 721. The various hardware memory units in memory 715 may include volatile and nonvolatile, removable and non-removable media implemented in any method or technology for storage of information such as computer readable instructions, data structures, program modules or other data. Certain devices/ systems within hazard detection and broadcast computing system may have minimum hardware requirements in order to support sufficient storage capacity, analysis capacity, network communication, etc. For instance, in some embodiments, one or more nonvolatile hardware memory units having a minimum size (e.g., at least 1 gigabyte (GB), 2 GB, 5 GB, etc.), and/or one or more volatile hardware memory units having a minimum size (e.g., 256 megabytes (MB), 512 MB, 1 GB, etc.) may be used in a device 701 (e.g., a mobile computing device 701, hazard detection and broadcast computing platform 701, etc.), in order to evaluate and analyze data, identify and detect hazards or obstructions, generate groups and transmit notifications to an identified group, and the like. Memory 715 also may include one or more physical persistent memory devices and/or one or more non-persistent memory devices. Memory 715 may include, but is not limited to, random access memory (RAM) 705, read only memory (ROM) 707, electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processor 703.

Processor 703 may include a single central processing unit (CPU), which may be a single-core or multi-core processor (e.g., dual-core, quad-core, etc.), or may include multiple CPUs. Processor(s) 703 may have various bit sizes (e.g., 16-bit, 32-bit, 64-bit, 96-bit, 128-bit, etc.) and various processor speeds (ranging from 100 MHz to 5 Ghz or faster). Processor(s) 703 and its associated components may allow the hazard detection and broadcast system 701 to execute a series of computer-readable instructions, for example, receive sensor data, detect and identify a hazard or obstruction, generate user groups, identify a group, generate and transmit notifications, and the like.

The computing device (e.g., a mobile computing device, computing platform, server, external server, etc.) may operate in a networked environment 700 supporting connections to one or more remote computers, such as terminals 750 and 751. The terminals 750 and 751 may be personal computers, servers (e.g., web servers, database servers), or mobile communication devices (e.g., mobile phones, portable computing devices, on-board vehicle-based computing systems, and the like), and may include some or all of the elements described above with respect to the hazard detection and broadcast computing device 701. The network connections depicted in FIG. 7 include a local area network (LAN) 725 and a wide area network (WAN) 729, and a wireless telecommunications network 733, but may also include other networks. When used in a LAN networking environment, the hazard detection and broadcast computing device 701 may be connected to the LAN 725 through a network interface or adapter 723. When used in a WAN networking environment, the device 701 may include a modem 727 or other means for establishing communications over the WAN 729, such as network 731 (e.g., the Internet). When used in a wireless telecommunications network 733, the device 701 may include one or more transceivers, digital signal processors, and additional circuitry and software for communicating with wireless computing devices 740 (e.g., mobile phones, portable computing devices, on-board vehicle-based computing systems, etc.) via one or more network devices 735 (e.g., base transceiver stations) in the wireless network 733.

Also illustrated in FIG. 7 is a security and integration layer 760, through which communications may be sent and managed between the device 701 (e.g., a user's personal mobile device, hazard detection and broadcast platform or server, etc.) and the remote devices (750 and 751) and remote networks (725, 729, and 733). The security and integration layer 760 may comprise one or more separate computing devices, such as web servers, authentication servers, and/or various networking components (e.g., firewalls, routers, gateways, load balancers, etc.), having some or all of the elements described above with respect to the hazard detection and broadcast computing device 701. As an example, a security and integration layer 760 of a mobile computing device, computing platform, or a server operated by an insurance provider, financial institution, governmental entity, or other organization, may comprise a set of web application servers configured to use secure protocols and to insulate the server 701 from external devices 750 and 751. In some cases, the security and integration layer 760 may correspond to a set of dedicated hardware and/or software operating at the same physical location and under the control of same entities as computing device 701. For example, layer 760 may correspond to one or more dedicated web servers and network hardware in an organizational datacenter or in a cloud infrastructure supporting a cloud-based data analysis system. In other examples, the security and integration layer 760 may correspond to separate hardware and software components which may be operated at a separate physical location and/or by a separate entity.

As discussed herein, the data transferred to and from various devices in the computing system 700 may include secure and sensitive data, such as device usage data, application usage data, vehicle data, insurance claim data, and the like. Therefore, it may be desirable to protect transmissions of such data by using secure network protocols and encryption, and also to protect the integrity of the data when stored on in a database or other storage in a mobile device, offer generation computing platform or server and other computing devices in the system 700, by using the security and integration layer 760 to authenticate users and restrict access to unknown or unauthorized users. In various implementations, security and integration layer 760 may provide, for example, a file-based integration scheme or a service-based integration scheme for transmitting data between the various devices in a system 700. Data may be transmitted through the security and integration layer 760, using various network communication protocols. Secure data transmission protocols and/or encryption may be used in file transfers to protect to integrity of the data, for example, File Transfer Protocol (FTP), Secure File Transfer Protocol (SFTP), and/or Pretty Good Privacy (PGP) encryption. In other examples, one or more web services may be implemented within the various devices 701 in the system 700 and/or the security and integration layer 760. The web services may be accessed by authorized external devices and users to support input, extraction, and manipulation of the data (e.g., device usage data, location data, vehicle data, etc.) between the various devices 701 in the system 700. Web services built to support system 700 may be cross-domain and/or cross-platform, and may be built for enterprise use. Such web services may be developed in accordance with various web service standards, such as the Web Service Interoperability (WS-I) guidelines. In some examples, a web service may be implemented in the security and integration layer 760 using the Secure Sockets Layer (SSL) or Transport Layer Security (TLS) protocol to provide secure connections between servers 701 and various clients 750 and 751 (e.g., mobile devices, data analysis servers, offer generation computing platform, etc.). SSL or TLS may use HTTP or HTTPS to provide authentication and confidentiality. In other examples, such web services may be implemented using the WS-Security standard, which provides for secure SOAP messages using XML encryption. In still other examples, the security and integration layer 760 may include specialized hardware for providing secure web services. For example, secure network appliances in the security and integration layer 760 may include built-in features such as hardware-accelerated SSL and HTTPS, WS-Security, and firewalls. Such specialized hardware may be installed and configured in the security and integration layer 760 in front of the web servers, so that any external devices may communicate directly with the specialized hardware.

Although not shown in FIG. 7, various elements within memory 715 or other components in system 700, may include one or more caches, for example, CPU caches used by the processing unit 703, page caches used by the operating system 717, disk caches of a hard drive, and/or database caches used to cache content from database 721. For embodiments including a CPU cache, the CPU cache may be used by one or more processors in the processing unit 703 to reduce memory latency and access time. In such examples, a processor 703 may retrieve data from or write data to the CPU cache rather than reading/writing to memory 715, which may improve the speed of these operations. In some examples, a database cache may be created in which certain data from a database 721 (e.g., internal data database, external data database, etc.) is cached in a separate smaller database on an application server separate from the database server. For instance, in a multi-tiered application, a database cache on an application server can reduce data retrieval and data manipulation time by not needing to communicate over a network with a back-end database server. These types of caches and others may be included in various embodiments, and may provide potential advantages in certain implementations of performing functions describes herein.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computer devices and system components described herein may be configured to communicate using any of these network protocols or technologies.

Additionally, one or more application programs 719 may be used by the various computing devices 701 within hazard detection and broadcast computing system 700 (e.g., software applications, etc.), including computer executable instructions for receiving offer generation requests, extracting and transmitting data, analyzing data, generating user interfaces, generating offers or outputs, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASIC s), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. Furthermore, such aspects may take the form of a computer program product stored by one or more computer-readable storage media having computer-readable program code, or instructions, embodied in or on the storage media. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

The invention claimed is:

1. A computing platform, comprising:
a processing unit comprising a processor; and
a memory unit storing computer-executable instructions, which when executed by the processing unit, cause the computing platform to:
identify, based on received data generated by one or more sensors associated with a vehicle and representing driving behaviors of a driver of the vehicle, at least one irregularity in a road on which the vehicle is travelling;
receive, from a plurality of sources, additional data;
generate one or more groups of users based on a common vehicle type identified from the additional data;
identify, based on the at least one irregularity, at least one group of users of the one or more groups of users;
generate a notification identifying the at least one irregularity; and
transmit, using one or more wireless network connections, the generated notification to the identified at least one group of users.

2. The computing platform of claim 1, further including:
receiving data associated with a plurality of users, the received data including driving behavior data for each user of the plurality of users; and
grouping users of the plurality of users into identifiable groups of users based on the received data.

3. The computing platform of claim 1, wherein the at least one irregularity includes at least one of: a pot hole and an obstruction in the road.

4. The computing platform of claim 1, wherein the driving behaviors of the driver include at least one of: swerving, hard braking, lane deviations or sudden speed changes.

5. The computing platform of claim 1, wherein the at least one irregularity in the road is identified by analyzing the received data using machine learning.

6. The computing platform of claim 1, wherein the generated notification is personalized for the identified at least one group of users.

7. The computing platform of claim 1, wherein the common vehicle type relates to a profession associated with users in the one or more groups of users.

8. The computing platform of claim 1, wherein the generated notification is personalized for the at least one group of users by including a notification of an upcoming traffic stoppage.

9. A computing platform, comprising:

a processing unit comprising a processor; and a memory unit storing computer-executable instructions, which when executed by the processing unit, cause the computing platform to:

identify, based on machine learning analysis of received data related to driving behaviors of a driver of a vehicle, at least one irregularity in a road on which the vehicle is travelling;

receive, from a plurality of sources, additional data;

generate one or more groups of users based on a type of vehicle identified from the additional data;

identify, based on the at least one irregularity and the additional data and using machine learning, at least one group of users of the one or more groups of users having driving behaviors similar to the driving behaviors of the driver of the vehicle;

generate a notification identifying the at least one irregularity and identifying an alternate route to avoid the identified at least one irregularity; and transmit, using one or more wireless network connections, the generated notification to the identified at least one group of users.

10. The computing platform of claim 9, wherein the plurality of sources includes a plurality of other vehicles at or near a location of the vehicle.

11. The computing platform of claim 9, wherein the driving behaviors of the driver include at least one of: swerving, hard braking, lane deviations or sudden speed changes.

12. The computing platform of claim 11, wherein the data related to the driving behaviors of the driver includes data captured by one or more sensors configured to detect movement of the vehicle.

13. The computing platform of claim 12, wherein the one or more sensors are arranged in a mobile device of the driver and wherein the one or more sensors detect movement of the mobile device and translate the movement to identified irregularities.

14. The computing platform of claim 9, wherein the generated notification is personalized for the identified at least one group of users.

15. The computing platform of claim 9, wherein the alternate route is customized for the at least one group of users.

16. A method, comprising:

receiving, by a computing device having a processor and memory, sensor data from a plurality of sensors detecting movement of a vehicle;

analyzing, by the processor, the received sensor data to identify one or more driving behaviors of a driver of the vehicle;

identifying, by the processor and based on machine learning analysis of the analyzed sensor data, at least one irregularity in a road on which the vehicle is travelling;

receiving, by the processor and from a plurality of sources, additional data;

generating, by the processor, at least one group of users based on a common vehicle type identified from the additional data;

identifying, by the processor using machine learning and based on the at least one irregularity and the additional data, a plurality of vehicles within a predefined distance of the vehicle;

identifying, by the processor, users associated with the plurality of vehicles and in the at least one group of users;

generating, by the processor, a notification identifying the at least one irregularity; and transmitting, by the processor and using one or more wireless network connections, the generated notification to the plurality of vehicles within the predefined distance of the vehicle and associated with users in the at least one group of users.

17. The method of claim 16, further including transmitting the generated notification from the vehicle to the plurality of vehicles.

18. The method of claim 16, wherein the generated notification is personalized for the identified at least one group of users.

19. The method of claim 16, wherein the plurality of sensors is arranged in a mobile device of the driver.

20. The method of claim 16, wherein the common vehicle type includes at least one of a first responder vehicle, a bus, or a fleet vehicle.

* * * * *